United States Patent
Kong

(10) Patent No.: US 8,988,708 B2
(45) Date of Patent: Mar. 24, 2015

(54) HOST DEVICE TO MONITOR STATUS OF IMAGE FORMING APPARATUS AND CONTROL METHOD THEREOF

(75) Inventor: Tae Kook Kong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 711 days.

(21) Appl. No.: 13/137,448

(22) Filed: Aug. 16, 2011

(65) Prior Publication Data

US 2012/0044524 A1 Feb. 23, 2012

(30) Foreign Application Priority Data

Aug. 18, 2010 (KR) .................. 10-2010-0079560
Aug. 3, 2011 (KR) .................. 10-2011-0077329

(51) Int. Cl.
  *G06F 3/12* (2006.01)
  *H04L 29/08* (2006.01)
  *G03G 15/00* (2006.01)
  *G06Q 10/10* (2012.01)

(52) U.S. Cl.
  CPC .......... *H04L 67/025* (2013.01); *G03G 15/5079* (2013.01); *G06Q 10/10* (2013.01); *G03G 2215/00113* (2013.01)
  USPC ........................................ 358/1.15

(58) Field of Classification Search
  CPC combination set(s) only.
  See application file for complete search history.

(56) References Cited

U.S. PATENT DOCUMENTS

| | | |
|---|---|---|
| 2002/0032790 A1 | 3/2002 | Linderman |
| 2004/0190057 A1* | 9/2004 | Takahashi et al. ........... 358/1.15 |
| 2009/0147299 A1 | 6/2009 | Tetu |
| 2010/0106834 A1 | 4/2010 | Isaacson et al. |

FOREIGN PATENT DOCUMENTS

WO 01/35577 A2 5/2001

OTHER PUBLICATIONS

European Search Report dated Nov. 23, 2011 issued in corresponding European Patent Application No. 11177693.6.

* cited by examiner

*Primary Examiner* — Benny Q Tieu
*Assistant Examiner* — Sunil Chacko
(74) *Attorney, Agent, or Firm* — Staas & Halsey LLP

(57) ABSTRACT

A host device is configured to upload a message informing of a status of the image forming apparatus to a network service which allows users to share messages on a website. This allows an administrator of the image forming apparatus device to manage the image forming apparatus, irrespective of time and place, by simply accessing the website of a service server providing the network service, which enables more efficient management of the image forming apparatus.

20 Claims, 20 Drawing Sheets

HOST DEVICE TO MONITOR STATUS OF IMAGE FORMING APPARATUS AND CONTROL METHOD THEREOF

CROSS-REFERENCE TO RELATED APPLICATIONS

This application claims the benefit of Korean Patent Applications No. 2010-0079560, filed on Aug. 18, 2010 and No. 2011-0077329, filed on Aug. 3, 2011 in the Korean Intellectual Property Office, the disclosures of which are incorporated herein by reference.

BACKGROUND

1. Field

Embodiments of the present disclosure relate to a host device to monitor the status of an image forming apparatus and a control method thereof and a control method of an image forming apparatus.

2. Description of the Related Art

A variety of methods to monitor and solve possible errors of an image forming apparatus in real time have been provided.

As a representative example, there is a method in which a central server monitors an image forming apparatus in real time to sense any error of the image forming apparatus and informs a previously designated user of occurrence of the error via e-mail, SMS (Short Message Service) or the like.

However, using an e-mail service causes user inconvenience because the user has to search for an associated mail in a list of received mail and open and read the mail. Further, using SMS has difficulty in sending a large amount of text because a mobile device has a limit in capacity to receive a message at once.

SUMMARY

It is an aspect of the present disclosure to provide a host device and a control method thereof and a control method of an image forming apparatus, wherein the host device functions to upload a message informing of the status of the image forming apparatus to a network service server that provides a network service so as to allow an administrator of the image forming apparatus to confirm the message informing the status of the image forming apparatus from a network service website on which the administrator can share the message.

Additional aspects of the disclosure will be set forth in part in the description which follows and, in part, will be apparent from the description, or may be learned by practice of the disclosure.

In accordance with one aspect of the disclosure, a control method of a host device, the host device serving to manage at least one image forming apparatus, includes collecting status information of the at least one image forming apparatus, producing a status message informing of a status change if the at least one image forming apparatus undergoes the status change that requires management, and controlling uploading of the produced status message to a Social Network Service (SNS) server, wherein the SNS server provides SNS to allow an administrator of the image forming apparatus to confirm the produced status message on an SNS website on which users may read messages simultaneously to share the messages.

The status message producing may include judging whether or not informing status information relating to the status change is set up and producing the status message containing the status information relating to the status change if informing of the status information is set up.

The status message producing may include producing the status message containing at least one of a name and an IP address of the image forming apparatus which has undergone the status change.

In the status message producing, the status information may include at least one of paper related information, operation related information, apparatus related information and toner related information of the image forming apparatus which has undergone the status change.

The status message uploading controlling may include accessing an IP address of the SNS server, logging in to the SNS server using SNS account information given to the host device after being connected to the SNS server, and transmitting the status message to the SNS server after logging in to the SNS server.

The SNS server may have a limit as to the number of receivable messages per SNS account, the host device may include a plurality of SNS accounts via which the host device may log in to the SNS server, and the SNS server logging-in may include changing a current SNS account into another SNS account if the number of messages transmitted using the current SNS account used to log in to the SNS server exceeds the number of messages preset by the SNS server.

If the host device includes the plurality of SNS accounts via which the host device may log in to the SNS server, the method may further include transmitting a list of the plurality of SNS accounts to e-mail addresses that are preset to correspond to the plurality of SNS accounts.

In the status message uploading controlling, the status message may include any one of tag information, which represents the number of messages transmitted up to now via the current SNS account and the total number of transmittable messages, and tag information which represents a ratio of the number of transmitted messages to the total number of transmittable messages per hundred (%).

The status message uploading controlling may include comparing a length of the status message with a message length preset by the SNS server, and dividing and transmitting the status message to have a length within a message length range preset by the SNS server if a comparative result shows that the length of the message exceeds the message length preset by the SNS server.

The control method may further include receiving a command message from the SNS server if messages uploaded to the SNS website by other users include the command message mailed to the host device, analyzing the received command message, and controlling operation of the corresponding image forming apparatus based on the analyzed command message.

The command message analyzing may include judging whether or not at least one command execution item included in the received command message is activated, and judging the activated command execution item into a valid command.

In accordance with another aspect of the disclosure, a host device to manage at least one image forming apparatus, includes a first network interface unit to communicate with the at least one image forming apparatus via a network, a second network interface unit to communicate with an SNS server via a network, wherein the SNS server provides SNS to allow users to read messages simultaneously on a website to share the messages, and a control unit to collect status information of the at least one image forming apparatus, produce a status message informing of a status change if the at least one image forming apparatus undergoes the status change that requires management, and control uploading of the produced status message to the SNS server so as to allow an administrator of the image forming apparatus to confirm the produced status message on the SNS website.

The control unit may judge whether or not informing status information relating to the status change is set up and produces the status message containing the status information relating to the status change if informing of the status information is set up.

The control unit may produce the status message containing at least one of a name and an IP address of the image forming apparatus which has undergone the status change.

The control unit may access an IP address of the SNS server via the second network interface unit, may log in to the SNS server using SNS account information given to the host device after being connected to the SNS server, and may transmit the status message to the SNS server after logging in to the SNS server.

The SNS server may have a limit as to the number of receivable messages per SNS account, and the host device may include a plurality of SNS accounts via which the host device may log in to the SNS server, and the control unit may change a current SNS account into another SNS account if the number of messages transmitted using the current SNS account used to log in to the SNS server exceeds the number of messages preset by the SNS server.

If the host device may include the plurality of SNS accounts via which the host device may log in to the SNS server, the control unit may transmit a list of the plurality of SNS accounts to e-mail addresses that are preset to correspond to the plurality of SNS accounts.

The control unit may produce the status message including any one of tag information, which represents the number of messages transmitted up to now via the current SNS account and the total number of transmittable messages, and tag information which represents a ratio of the number of transmitted messages to the total number of transmittable messages per hundred (%).

The control unit may compare a length of the status message with a message length preset by the SNS server, and may divide and transmit the status message to have a length within a message length range preset by the SNS server if a comparative result shows that the length of the message exceeds the message length preset by the SNS server.

The control unit may receive a command message from the SNS server if messages uploaded to the SNS website by other users include the command message mailed to the host device, analyzes the received command message, and may control operation of the corresponding image forming apparatus based on the analyzed command message.

The control unit may judge whether or not at least one of command execution items included in the received command message is activated, and may judge the activated command execution item into a valid command.

In accordance with a further aspect of the disclosure, a control method of an image forming apparatus connected to a host device, includes collecting status information of the image forming apparatus, and transmitting the collected status information to the host device, wherein the host device, which has received the transmitted status information, judges whether or not the image forming apparatus undergoes a status change that requires management based on the status information, produces a status message informing of the status change if the status change occurs, and uploads the produced status message to a Social Network Service (SNS) server, wherein the SNS server provides SNS to allow an administrator of the image forming apparatus to confirm the produced status message on an SNS website on which users may share messages.

The status information may include at least one of paper related information, operation related information, apparatus related information and toner related information of the image forming apparatus.

The control method may further include receiving a command from the host device, and executing an operation commanded by the host device if the received command is a command based on a command message mailed to the host device among messages uploaded to the SNS website by other users.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
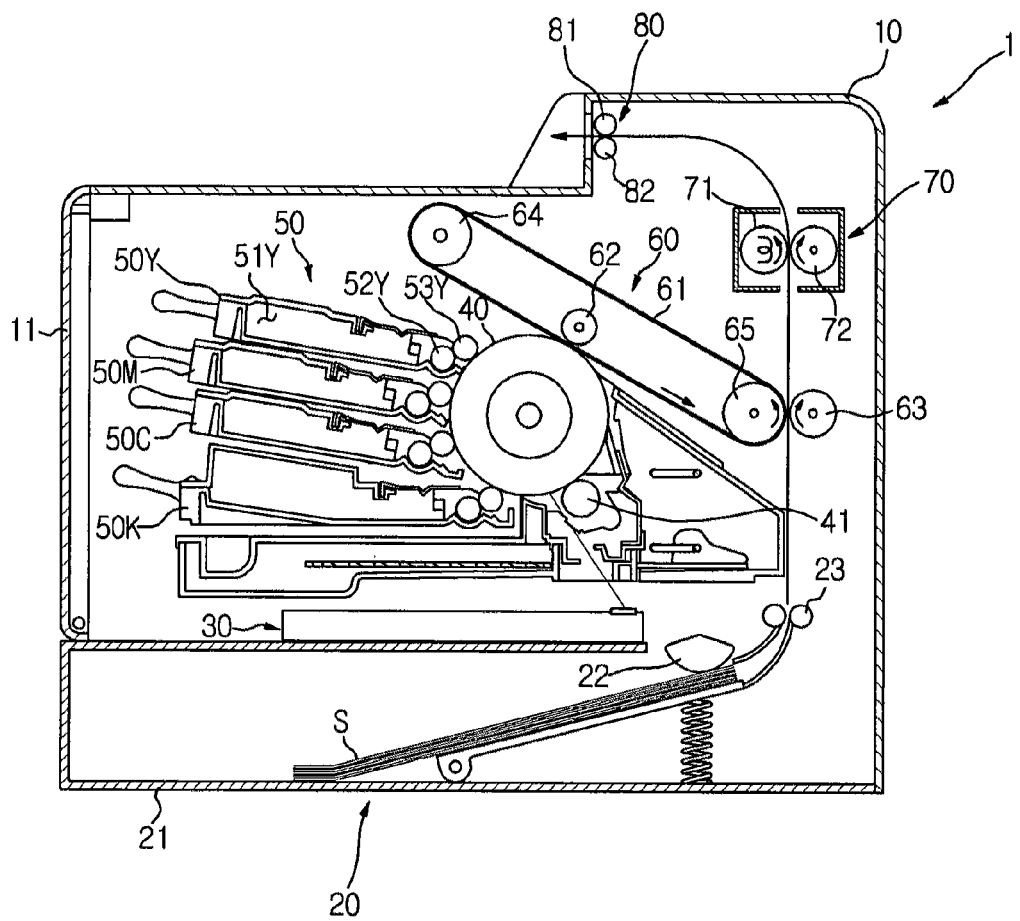
FIG. 1 is a view illustrating a schematic configuration of an image forming apparatus in accordance with an embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating a schematic configuration of an image forming apparatus in accordance with an embodiment of the present disclosure.

As illustrated in FIG. 1, the image forming apparatus 1 in accordance with the embodiment of the present disclosure includes a main body 10, a print media feeding device 20, a light scanning device 30, a photoconductor 40, a developing device 50, a transfer device 60, a fusing device 70 and a print media discharge device 80.

The main body 10 defines the external appearance of the image forming apparatus 1 and supports a variety of elements installed therein. A main body cover 11 is pivotally installed to one side of the main body 10. Thereby, the main body cover 11 opens or closes a part of the main body 10.

The print media feeding device 20 feeds print media to the transfer device 60. The print media feeding device 20 includes a cassette 21 in which print media S is stored, a pickup roller 22 to pick up the print media S stored in the cassette 21 sheet by sheet, and a conveyance roller 23 to convey the picked-up print media to the transfer device 60.

The light scanning device 30 is located below the developing device 50 and irradiates light corresponding to image information to the photoconductor 40 so as to form an electrostatic latent image on a surface of the photoconductor 40

The photoconductor 40 is configured in such a manner that a photo conductive layer is formed on the periphery of a cylindrical metallic drum. The photoconductor 40 is an image carrier on which an electrostatic latent image is formed by the light scanning device 30 and a toner image is formed by the developing device 50. The photoconductor 40 is rotatably installed in the main body 10.

A charge roller 41 is installed in the main body 10. The charge roller 41 charges the photoconductor 40 with a predetermined electric potential before the light scanning device 30 irradiates light to the photoconductor 40. The charge roller 41 is one example of a charger to charge the photoconductor 40 with an even electric potential. The charge roller 41 performs supply of electric charge while rotating in contact with or not in contact with an outer peripheral surface of the photoconductor 40, thereby charging the outer peripheral surface of the photoconductor 40 with an even electric potential. Instead of the charge roller 41, a corona discharger may be employed.

The developing device 50 forms a toner image by feeding toner to the photoconductor 40 on which the electrostatic latent image has been formed. The developing device 50 includes four developing units 50Y, 50M, 50C and 50K in which different colors of toners, for example, Yellow, Magenta, Cyan and Black toners are received respectively.

The developing units 50Y, 50M, 50C and 50K respectively include toner cartridges 51Y, 51M, 51C and 51K, feeding rollers 52Y, 52M, 52C and 52K and developing rollers 53Y, 53M, 53C and 53K. In FIG. 1, only the reference numerals for toner cartridges 51Y, feeding roller 52Y and developing roller 53Y are shown.

The toner cartridges 51Y, 51M, 51C and 51K store toners to be fed to the photoconductor 40.

The feeding rollers 52Y, 52M, 52C and 52K feed the toners stored in the toner cartridges 51Y, 51M, 51C and 51K to the developing rollers 53Y, 53M, 53C and 53K. To this end, a feeding bias voltage is applied to the feeding rollers 52Y, 52M, 52C and 52K.

The developing rollers 53Y, 53M, 53C and 53K attach the toners to the surface of the photoconductor 40 on which the electrostatic latent image has been formed, to form toner images. To develop the electrostatic latent images on the photoconductor 40 using the toners fed by the feeding rollers 52Y, 52M, 52C and 52K, a developing bias voltage is applied to the developing rollers 53y, 53M, 53C and 53K.

The transfer device 60 includes an intermediate transfer belt 61, a first transfer roller 62 and a second transfer roller 63.

The intermediate transfer belt 61 is an image carrier to carry the toner images formed by the developing device 50. The intermediate transfer belt 61 is supported by support rollers 64 and 65 and circulates at the same velocity as a linear velocity of the photoconductor 40. A length of the intermediate transfer belt 61 is equal to or greater than a length of the print media S of a maximum size used in the image forming apparatus 1.

The first transfer roller 62 is arranged to face the photoconductor 40 with the intermediate transfer belt 61 interposed therebetween and serves to transfer the toner images formed on the photoconductor 40 to the intermediate transfer belt 61. To enable transfer of the toner images from the photoconductor 40 to the intermediate transfer belt 61, a first transfer bias voltage is applied to the first transfer roller 62.

The second transfer roller 63 is arranged to face the support roller 65 with the intermediate transfer belt 61 interposed therebetween. The second transfer roller 63 is spaced apart from the intermediate transfer belt 61 while the images are being transferred from the photoconductor 40 to the intermediate transfer belt 61, but comes into contact with the intermediate transfer belt 61 at a predetermined contact pressure after the developer images of the photoconductor 40 have been completely transferred to the intermediate transfer belt 61. When the second transfer roller 63 comes into contact with the intermediate transfer belt 61, the developer images on the intermediate transfer belt 61 are transferred to the print medium. A second transfer bias voltage to transfer the toner images to the print medium is applied to the second transfer roller 63.

The fusing device 70 includes a heating roller 71 having a heat source and a pressure roller 72 installed opposite the heating roller 71. When the print medium passes between the heating roller 71 and the pressure roller 72, the image is fixed to the print medium by heat transferred from the heating roller 71 and pressure acting between the heating roller 71 and the pressure roller 72.

The print media discharge device 80 includes a discharge roller 81 and a discharge backup roller 82 to discharge the print medium having passed through the fusing device 70 to the outside of the main body 10.

Hereinafter, operation of the image forming apparatus having the above described configuration will be described in brief.

If a printing operation begins, the charge roller 41 charges the surface of the photoconductor 40 with an even electric potential. The light scanning device 30 irradiates light corresponding to information of any one color image, e.g., a yellow image, to the surface of the photoconductor 40, the surface of the photoconductor 40 has evenly charged.

Thereby, an electrostatic latent image corresponding to the yellow image is formed on the photoconductor 40.

Subsequently, a developing bias voltage is applied to the developing roller 53Y of the yellow developing unit 50Y, causing yellow toner to be attached to the electrostatic latent image and consequently, a yellow toner image to be formed on the photoconductor 40. The toner image is transferred to the intermediate transfer belt 61 by the first transfer roller 62.

Once the yellow image has completely been transferred onto a sheet of the print medium, the light scanning device 30 irradiates light corresponding to information of another color image, e.g., magenta image to the photoconductor 40, thus forming an electrostatic latent image corresponding to the magenta image. The magenta developing unit 50M feeds magenta developer to the electrostatic latent image to form a magenta toner image. The magenta toner image formed on the photoconductor 40 is transferred to the intermediate transfer belt 61 by the first transfer roller 62. In this case, the magenta toner image overlaps the previously transferred yellow developer image.

As the above described operation is repeated for cyan and black, a color image created by overlaying yellow, magenta, cyan and black upon one another is completed on the intermediate transfer belt 61. The completed color image is transferred to the print medium passing between the intermediate transfer belt 61 and the second transfer roller 63, and the print medium is discharged to the outside of the main body 10 by way of the fusing device 70 and the print media discharge device 80.

Figure 2:
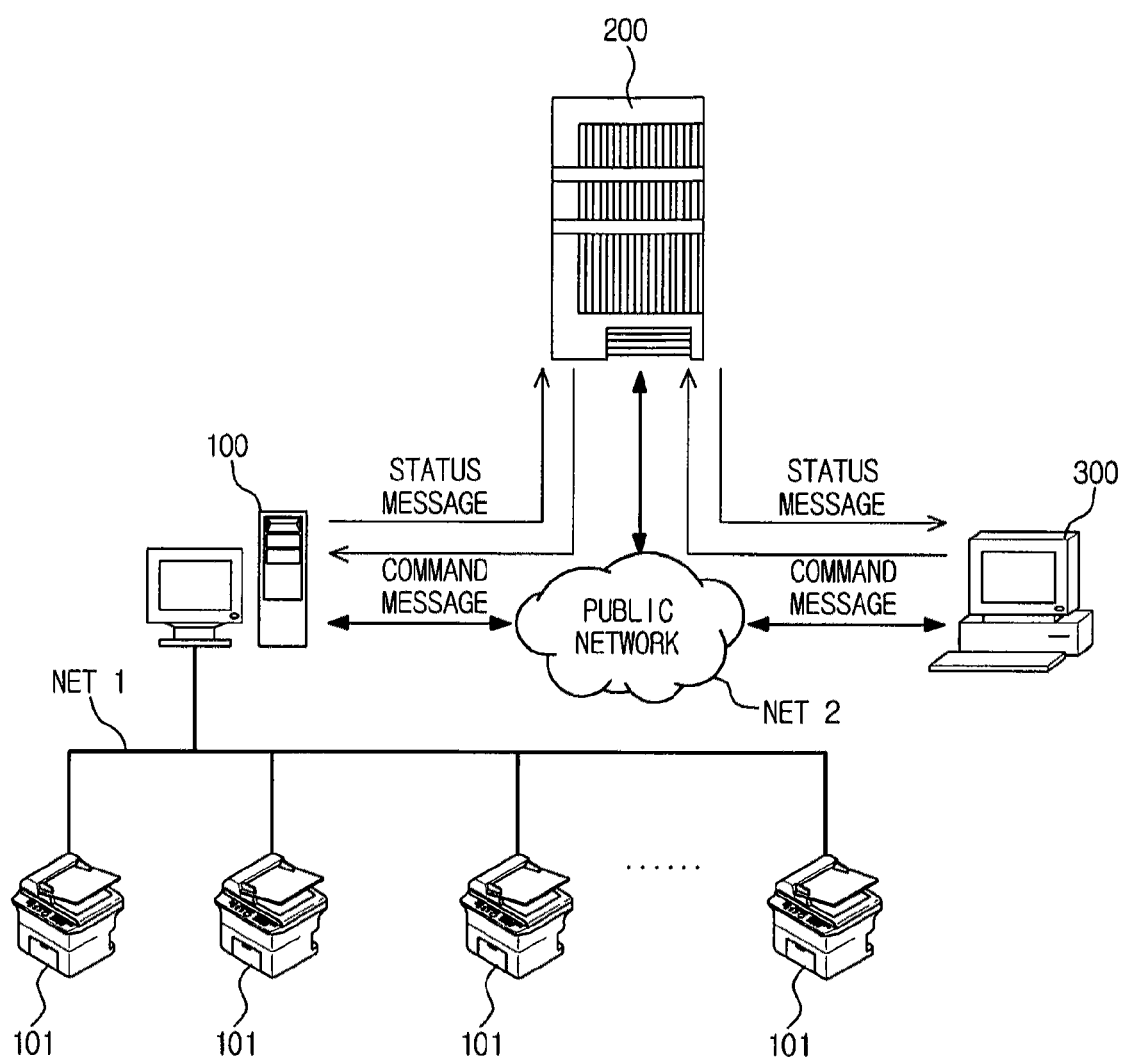
FIG. 2 is a view illustrating the overall configuration of a network system in accordance with an embodiment of the present disclosure.

FIG. 2 is a view illustrating the overall configuration of a network system in accordance with an embodiment of the present disclosure.

As illustrated in FIG. 2, the network system includes a host computer 100, a plurality of image forming apparatuses 101 connected to the host computer 100 via a private network NET 1 as an internal network, a service server 200 connected to the host computer 100 via a public network NET 2 as an external network, and a user terminal 300.

The host computer 100 functions to operate software for management of an image forming apparatus and thus, is provided with the software for management of an image forming apparatus.

The host computer 100 may include a Central Processing Unit (CPU), a Random Access Memory (RAM), Read Only Memory (ROM), a Disk Controller (DKC), a Hard Disk (HD), a network interface and an input/output interface, which are connected to a system bus. In this case, the system bus serves to connect constituent elements of the computer with one another. The CPU executes the image forming apparatus management software. The RAM provides a region for loading and execution of programs. The ROM provides a memory region of a system starting program, etc. The DKC serves to control access with a storage device, such as an HD, which stores booting programs, a variety of applications, edit files, user files, image forming apparatus management software, etc. If necessary, the CPU may refer to the image forming apparatus management software stored in the HD, or the software may be loaded into the RAM. The network interface is connected to the private network NET 1 as an internal network to enable network communication. The input/output interface is connected to a keyboard or a display to enable data input/output.

The host computer 100 collects status information of each image forming apparatus 101 and uploads a status messages informing of the status of the image forming apparatus 101 to the service server 200 by means of the image forming apparatus management software. The host computer 100 further analyzes a command message transmitted from the service server 200 to decode an image forming apparatus and command included in the command message and controls the corresponding image forming apparatus 101 to execute the corresponding command.

The image forming apparatus 101 is under management of the network system and may be, for example, a device combining functions of a copier, fax machine and printer, a color printer, or a black-and-white printer.

The service server 200 receives the status message of the image forming apparatus 101 uploaded by the host device 100 and posts the message on a website to allow users, who are allowed to share messages, to read the message. In this case, the service server 200 posts the status message of the image forming apparatus 101, provided by the host device 100, on a home screenshot on the website so as to allow every user who is allowed to share messages to read the message from the home screenshot. With this function of the service server 200, the host device 100 can read messages posted on the home screenshot by other users.

The service server 200 provides a network service which may include a Social Network Service (SNS) to allow registered users to share messages therebetween. SNS refers to a service to help a user communicate and share content with others and provides an environment to enable sharing and spreading of personal information of individual users and various content (e.g., moving images, photographs and messages). With use of SNS, a user may form and maintain a social relationship by sharing his/her content with others on a wireless or wired network. A server to provide SNS is referred to as an SNS server.

For example, if the user accesses the SNS server and inputs a web ID and password to the website of the SNS server, the SNS server judges whether or not the user pertains to a specific social relationship based on the web ID and password. If the user is an authentic user, the SNS server provides the user with messages of other users so as to allow the user to read the messages and also, provides other users with a message written by the user.

The user terminal 300 includes all devices connectable to the service server 200. For example, the user terminal 300 includes a smart phone, cellular phone, Personal Digital Assistant (PDA), Portable Multimedia Player (PMP), notebook computer, desktop computer, etc. Other terminals to realize various functions using several applications, such as a digital camera or camcorder having a wired or wireless communication function, are not excluded to the user terminal 300.

An administrator who manages the image forming apparatus 101 may confirm the status of the image forming apparatus 101 by accessing the service server 200 via the user terminal 300 and reading the status message of the image forming apparatus 101 posted on the home screenshot. The administrator may further access the service server 200 via the user terminal 300 to post a command message, suitable to control the status of the image forming apparatus 101, on the home screenshot.

In the network system in accordance with the embodiment of the disclosure having the above described configuration, the host device 100 serves as a part of the network service in which users can share messages. As the host device 100 uploads the status message of the image forming apparatus 101 to the service server 200, the administrator of the image forming apparatus 101 may confirm, irrespective of time and place, the current status of the image forming apparatus 101 from the home screenshot of the service server 200 by simply accessing the service server 200 via the user terminal 300 and also, may post a desired command message on the home screenshot so as to allow the host device 100 to take a measure of the image forming apparatus 101, which enables real-time management of the image forming apparatus 101.

Although the above embodiment describes the host device 100 as exchanging a message with the service server 200 on behalf of all image forming apparatuses 101, the embodiment is not limited thereto and any one of the plurality of image forming apparatuses 101 may serve as the host device 100.

For convenience of description, it is noted that the service server 200 is an SNS server in the following description.

Figure 3:
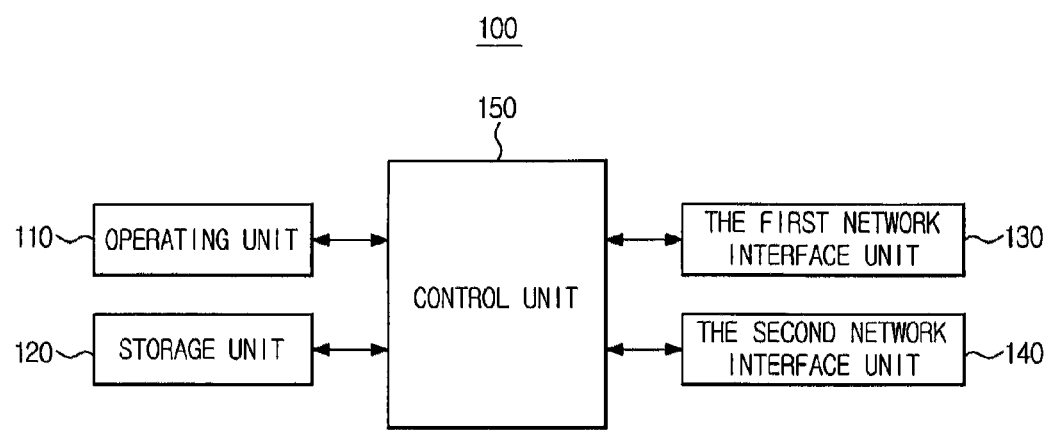
FIG. 3 is a schematic control block diagram of a host device illustrated in FIG. 2.

FIG. 3 is a schematic control block diagram of the host device illustrated in FIG. 2.

As illustrated in FIG. 3, the host device 100 includes an operating unit 110, a storage unit 120, a first network interface unit 130, a second network interface unit 140 and a control unit 150.

The operating unit 110 includes an operating panel provided with a variety of functional keys and a display panel. The operating panel outputs signals, required to select, execute and request various functions provided by the host device 100, to the control unit 150. To this end, the operating panel includes a variety of functional keys and a touch screen. The display panel displays a screenshot showing the current state of the host device 100 or a variety of setup screenshots under control of the control unit 150. The display panel may be realized by a Liquid Crystal Display (LCD), Cathode Ray Tube (CRT), Plasma Display Panel (PDP) or the like.

The user inputs a command, required to select, execute and request each function provided by the host device 100, to the host device 100 by means of the operating unit 110.

In particular, to set up the status message of the image forming apparatus 101 to be produced by the host device 100, the user inputs some status information items of the image forming apparatus 101 which the user desires to manage, and tags and collection periods for the status information items by means of the operating unit 110. In addition, to set up access to the SNS server 200, the user inputs address information of the SNS server 200, such as a Uniform Resource Locator (URL), log-in information for the SNS server 200, such as a web ID and password, and proxy server information, such as an IP address and communication port number of a proxy server, by means of the operating unit 110.

The storage unit 120 stores the desired status information items, tags and collection periods input by the user via the operating unit 110.

The image forming apparatus 101 may undergo a status change by several factors. In this case, the status of the image forming apparatus 101 may represent whether or not respective components of the image forming apparatus 101 can smoothly perform a printing operation, or may represent the current status or operation mode of each component.

Examples of the status of the image forming apparatus 101 include a paper status including 'paper jam' or 'out of paper', an operation status including 'job completed' or 'job deleted', a device status including 'device discovery completed' and 'device connection failure', and a toner status including 'toner low' and 'no toner'.

The storage unit 120 further stores proxy server information and address information and log-in information with respect to the SNS server 200 input by the user via the operating unit 110.

The first network interface unit 130 serves as a communication interface between the host device 100 and each image forming apparatus 101. The first network interface unit 130 receives status information transmitted from the image forming apparatus 101 and transmits a command message transmitted from the SNS server 200 to the image forming apparatus 101.

The second network interface unit 140 serves as a communication interface between the host device 100 and the SNS server 200. The second network interface unit 140 transmits the status message of the image forming apparatus 101 produced by the control unit 150 to the SNS server 200 and receives a command message transmitted from the SNS server 200.

The control unit 150 controls general functions of the host device 100. The control unit 150 controls signal input/output between the operating unit 100, the storage unit 120, the first network interface unit 130 and the second network interface unit 140.

If a signal to request setup of the status information of the image forming apparatus 101 which will be included in a message to be uploaded to the SNS server 200 is input via the operating unit 110, the control unit 150 controls the display panel of the operating unit 110 so as to display a status information setup screenshot. In this case, the status information setup screenshot includes a screenshot for input of a tag per status information and a desired status item to be managed.

The control unit 150 further stores the input status information items, tags and collection periods in the storage unit 120. Here, the status information items are used to allow the user to select whether or not to inform of the status change of the image forming apparatus 101 when the status of the image forming apparatus 101 is changed.

The status information tags of the image forming apparatus 101 facilitate easy classification and searching for status information and are input by the user. For example, a tag 'paper' may be allotted to status information such as 'paper jam' or 'out of paper'. The tag assists the user in easily searching for only desired status information even if there are present much status information.

Further, if a signal to request setup of access information to the SNS server 200, to which the message will be transmitted, is input via the operating unit 110, the control unit 150 controls display of a screenshot to set up access information to the SNS server 200.

Thereby, the control unit 150 stores address information of the SNS server 200 such as a URL input via the operating unit 110, and log-in information such as a web ID and a password given from the SNS server 200, in the storage unit 120. If necessary, the control unit 150 further stores proxy server information of the proxy server, such as an IP address and communication port number, which are input via the operating unit 110, in the storage unit 120.

When producing a message containing the status information of the image forming apparatus 101, the control unit 150 may produce a message containing both information regarding to changed statuses and information regarding to unchanged statuses. In the case of the message containing all status information, the status information may be represented in an abbreviated form. More particularly, instead of directly displaying error solution information, the control unit 150 may display indirect information to link to the error solution information. In this case, the user may advantageously easily recognize the current status of the image forming apparatus 101 by looking the message containing all status information from the home screenshot of the SNS server 200.

Alternatively, the control unit 150 may produce a message containing only partial status information, i.e. information regarding to changed statuses from among a plurality of status information of the image forming apparatus 101. This may prevent the user from confusing desired information with unnecessary information since the user can read the message containing only the partial information regarding to changed statuses from the home screenshot of the SNS server 200.

Alternatively, the control unit 150 may produce a message containing only previously selected status information as the user sets up whether or not to inform of the status information. For example, if any status of the image forming apparatus 101 is changed, but it is not preset to inform of the changed status, the control unit 150 does not need to inform of the status information and thus, does not produce a message.

If any status of the image forming apparatus 101 is changed and it is preset to inform of the changed status, the control unit 150 analyzes the changed status information and determines whether or not the changed status information item is one which the user desires to manage. If the changed status information item is the desired item to be managed, the control unit 150 produces a message containing tag information corresponding to the changed status information item.

In this case, the control unit 150 produces the message such that the message contains apparatus name information and/or IP address information of the image forming apparatus 101. For example, the message may be produced into the form of "Paper jam error occurred at CLX-8385N", "Toner low occurred at 10.88.183.32" or "Paper jam error occurred at CLX-8385N (10,88,183,32)".

After producing the message, the control unit 150 transmits the URL of the SNS server 200, the web ID and password stored in the storage unit 120, to the SNS server 200 via the second network interface unit 140, so as to connect the host device 100 to the SNS server 200.

Once the host device 100 accesses the SNS server 200, the control unit 150 transmits the produced message to the SNS server 200.

With the above-described message production and uploading functions of the control unit 150, the host device 100 may post the message informing of the status of the image forming apparatus 101 on the home screenshot of the SNS server 200. Any user, who is allowed by the host device 100 to read a message associated with the image forming apparatus 101, may read the message posted on the home screenshot of the SNS server 200. Thus, the administrator in charge of the image forming apparatus 101 may read the message posted by the host device 100 by accessing the SNS server 200 and inputting log-in information such as a web ID and password, which enables real-time monitoring of the image forming apparatus 101.

In addition, if a signal to request setup of a command item to be executed from among a plurality of command items included in a message received from the SNS server 200, is input, the control unit 150 controls the display panel of the operating unit 110 to display an execution command item setup screenshot. In this case, the screenshot includes a screenshot to set up a command, such as 'download latest firmware', 'update configuration' 'send billing report' to inform of account information of the image forming apparatus 101, 'send accounting report' to inform of log-in information of the host device 100, 'send error history report', 'send current error report', 'send toner low report', 'send toner order status' or the like. The screenshot also includes a screenshot to set up a period for confirming whether a new message is received.

The control unit 150 may further receive a command to be executed from a message that is input by the user via the operating unit 110.

With the received message command execution function of the control unit 150, the host device 100 may read and receive the message posted by the administrator on the home screenshot of the SNS server 200 and analyze and execute the command of the received message, which allows the image forming apparatus 101 to be simply controlled from a remote place.

Figure 4:
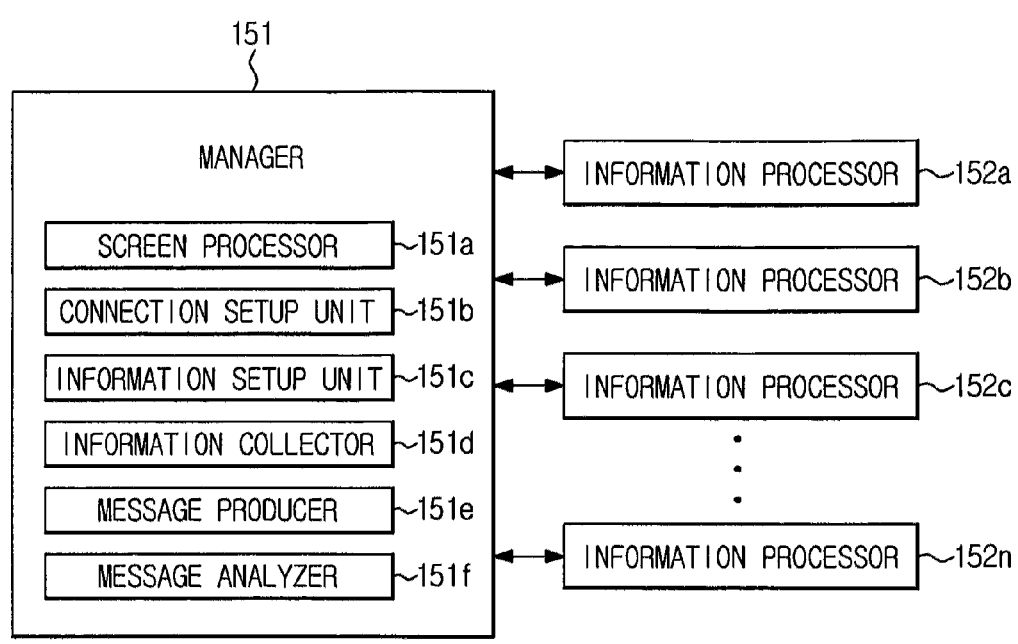
FIG. 4 is a schematic block diagram illustrating the configuration of a control unit illustrated in FIG. 3.

FIG. 4 is a schematic block diagram illustrating a configuration of the control unit illustrated in FIG. 3.

As illustrated in FIG. 4, the control unit 150 includes a manager 151 and a plurality of information processors 152a to 152n.

The respective information processors 152a to 152n analyze collected status information of the image forming apparatus 101. The respective information processors 152a to 152n may be mounted in an initial system organization stage, or may be mounted in real time after system organization.

The manager 151 serves to manage installation and operation of the respective information processors 152a to 152n.

The manager 151 also performs a control operation to produce a message containing status information of the image forming apparatus 101 and a control operation to transmit the produced message to the SNS server 200.

The manager 151 periodically confirms whether or not a new message mailed thereto is present on the home screenshot of the SNS server 200. If a new message is present, the manager 151 analyzes a command of the message and performs a control operation to execute the analyzed command.

The manager 151 includes a screen processor 151a, a connection setup unit 151b, a message setup unit 151c, an information collector 151d, a message producer 151e and a message analyzer 151f.

The screen processor 151a provides a user interface to allow the user to confirm and set up various information.

The connection setup unit 151b sets up a network connection between the host device 100 and the SNS server 200. In this case, the connection setup unit 151b sets up the URL of the SNS server 200, the web ID and the password based on information input by the user and if necessary, the IP address and communication port number of the proxy server, to enable the host device 100 to upload the status message of the image forming apparatus 101 to the SNS server 200.

The information setup unit 151c sets up a status information item which will be included in a message to be transmitted from the host device 100 to the SNS server 200. In this case, the information setup unit 151c sets up the status information item as well as tag and collection period of status information based on the information input by the user.

The information collector 151d periodically collects the status information of the image forming apparatus 101 analyzed by the respective information processors 152a to 152n.

The message producer 151e produces a message containing the status information of the item preset by the user from among the collected status information of the image forming apparatus 101.

The message analyzer 151f analyzes a command included in a message transmitted from the SNS server 200 and executes the analyzed command. In this case, the manager 151 analyzes the command of the message transmitted from the SNS server 200 and transmits the corresponding command to an execution module that can execute the corresponding command.

The respective components 151a to 151f of the manager 151 and the respective information processors 152a to 152n may be modules designed so as to be additionally mounted into a basic module. Of course, even the additionally mountable modules may also be designed as ones basically included in an initial system configuration.

Figure 5:
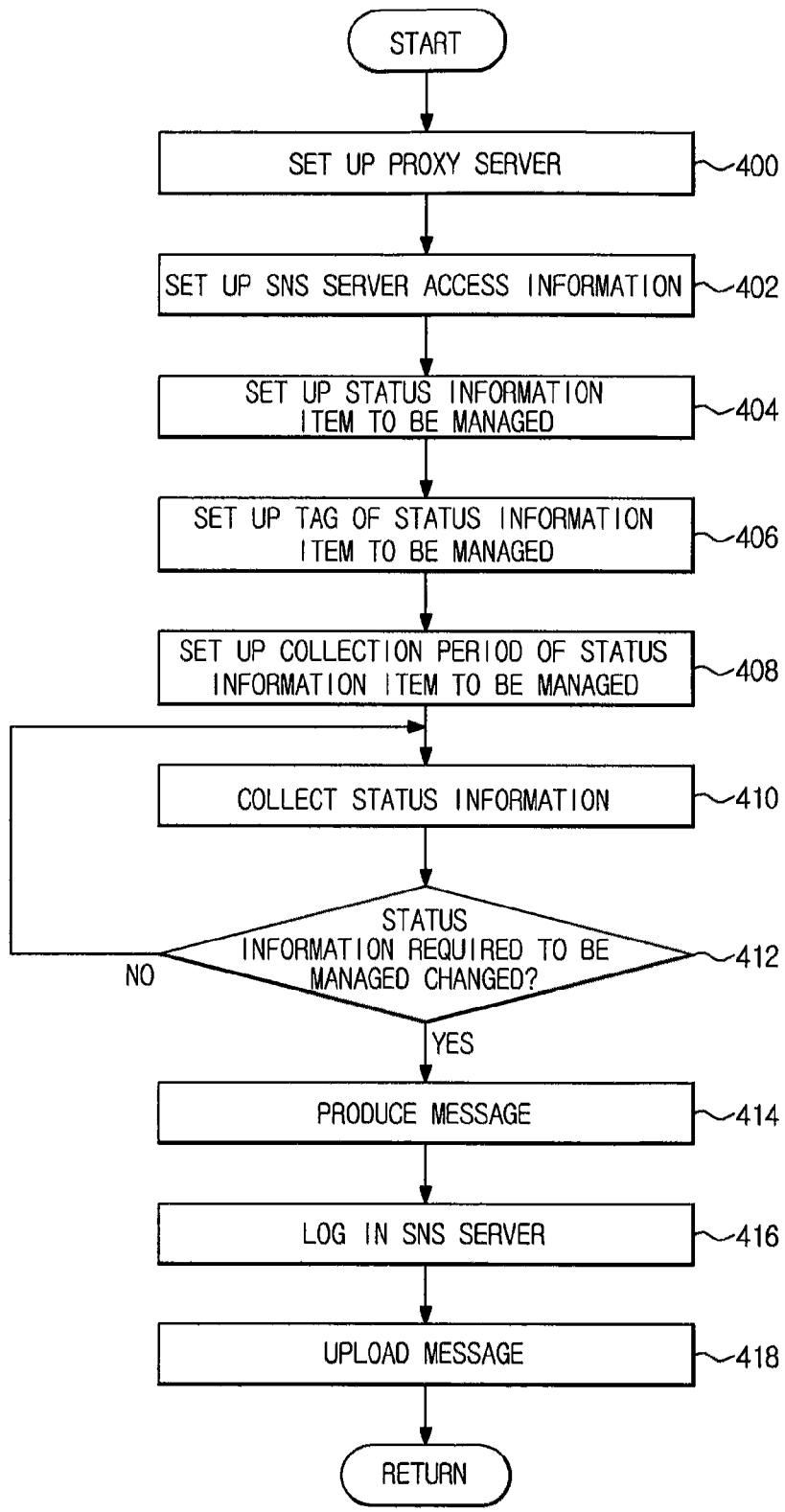
FIG. 5 is a flowchart illustrating a control process in which the host device of the network system in accordance with the embodiment of the present disclosure produces a message informing of a status change of the image forming apparatus and uploads the message to a service server.
Figure 6:
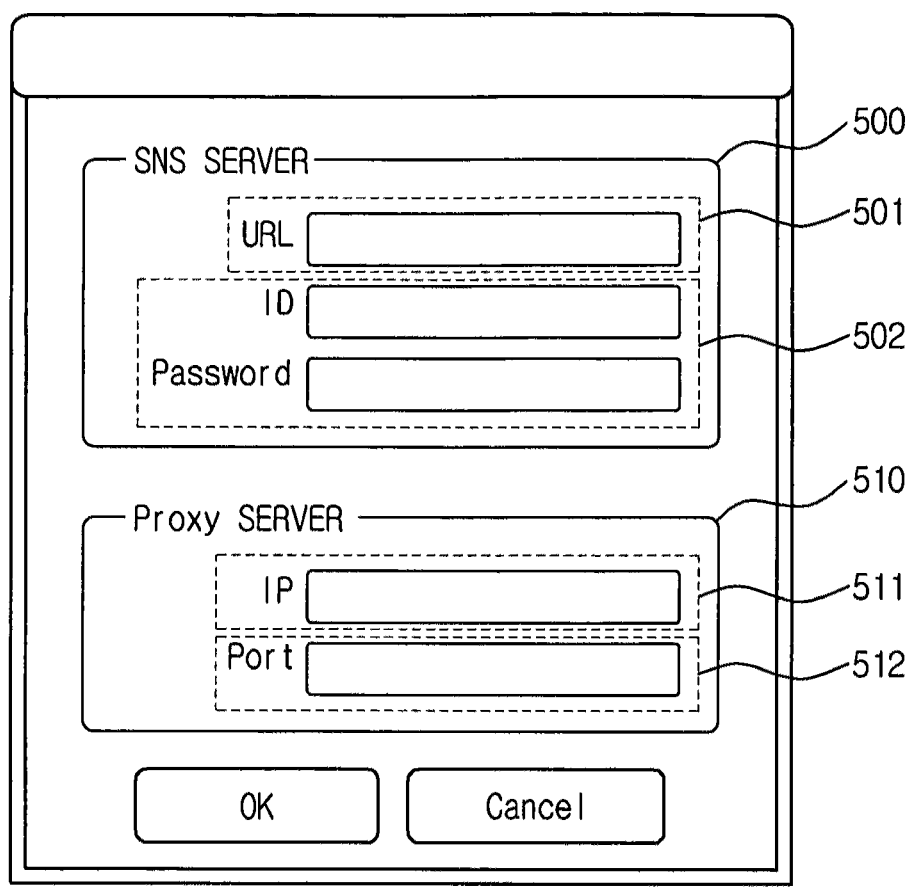
FIG. 6 is a view illustrating a screenshot through which the host device sets up information to access an SNS server according to FIG. 5.
Figure 7:
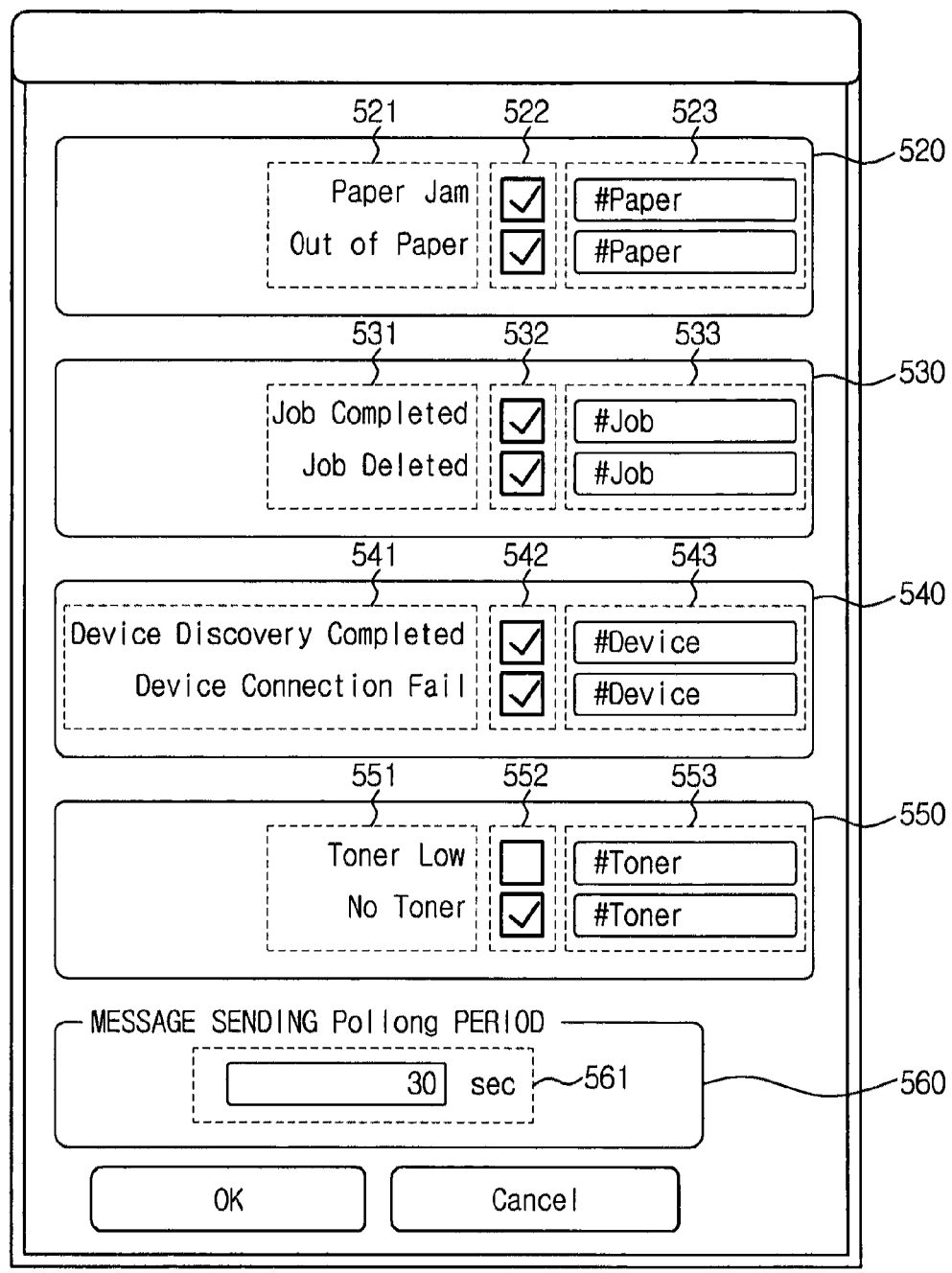
FIG. 7 is a view illustrating a screenshot through which the host device sets up status information items which will be included in the message to be uploaded to the SNS server according to FIG. 5.

FIG. 5 is a flowchart illustrating a control process in which the host device of the network system in accordance with the embodiment of the present disclosure produces a message informing of a status change of the image forming apparatus and uploads the message to the service server. FIG. 6 is a view illustrating a screenshot through which the host device sets up access information to access the SNS server. FIG. 7 is a view illustrating a screenshot through which the host device sets up a status information item which will be included in a message to be transmitted to the SNS server.

Referring to FIG. 5, the host device 100 sets up a proxy server (400). More particularly, the host device 100 receives information about an address and communication port number of the proxy server from the user and sets up the proxy server using the received information. In this case, if setup of the proxy server is unnecessary, this operation may be omitted.

Next, the host device 100 sets up information to access the SNS server 200 (402). More particularly, the host device 100 receives address information of the SNS server 200, such as an URL, given from the user, and log-in information (the web ID and the password) given from the SNS server 200, and sets up information to access the SNS server 200 using the received information.

As illustrated in FIG. 6, the screenshot through which the host device 100 sets up information to access the SNS server 200 includes an SNS server setup item 500 required to access to the SNS server 200 and a proxy server setup item 510 required to set up the proxy server.

The proxy server setup item 510 includes a proxy server IP address setup blank 511 and a communication port setup blank 512. Setup of the proxy server is possible by inputting appropriate values to the proxy server IP address setup blank 511 and the communication port setup blank 512.

The SNS server setup item 500 includes a URL setup blank 501 and a web ID/password setup blank 502. Setup of information to access the SNS server 200 is possible by inputting appropriate values into the URL setup blank 501 and the web ID/password setup blank 502.

Referring again to FIG. 5, after setting up the information to access the SNS server 200, the host device 100 sets up a status information item to be managed (404). More particularly, the host device 100 receives and sets up the status information item which the user desires to manage from among a plurality of status information items.

After setting up the status information item to be managed, the host device 100 sets up a tag of the status information item to be managed (406). More particularly, the host device 100 receives and sets up the tag of the status information item from the user.

After setting up the tag of the status information item to be managed, the host device 100 sets up a collection period of the status information item to be managed (408). More particularly, the host device 100 receives and sets up the collection period of the status information item from the user.

As illustrated in FIG. 7, the screenshot, through which the host device 100 sets up a status information items which will be included in a message to be transmitted to the SNS server 200, includes a paper item 520, an operation item 530, a device connection item 540 and a toner item 550.

The paper item 520 is an item to set up information related to paper, such as 'paper jam' or 'out of paper' 521. A check bar may be marked or unmarked in an item setup blank 522 so as to activate or deactivate the paper item 520. A tag setup blank 523 is used to set up a tag in such a manner that a tag of status information of the paper item 520 is input into the tag setup blank 523. For reference, FIG. 7 shows the tag '#Paper' input into the tag setup blank 523.

The operation item 530 is an item to set up information related to operation, such as 'job completed' or 'job deleted' 531. A check bar may be marked or unmarked in item setup blank 532 so as to activate or deactivate the operation item 530. A tag setup blank 533 is used to set up a tag in such a manner that a tag of status information of the operation item 530 is input into the tag setup blank 533. For reference, FIG. 7 shows the tag '#Job' input into the tag setup blank 533.

The device item 540 is an item to set up information related to a device, such as 'device discovery completed' or 'device connection failure' 541. A check bar may be marked or unmarked in an item setup blank 542 so as to activate or deactivate the device item 540. A tag setup blank 543 is used to set up a tag in such a manner that a tag of status information of the device item 540 is input into the tag setup blank 543. For reference, FIG. 7 shows the tag '#Device' input into the tag setup blank 543.

The toner item 550 is an item to set up information related to a toner, such as 'toner low or 'no toner' 551. A check bar may be marked or unmarked in an item setup blank 552 so as to activate or deactivate the toner item 550. A tag setup blank 553 is used to set up a tag in such a manner that a tag of status information of the toner item 550 is input into the tag setup blank 553. For reference, FIG. 7 shows the tag '#Toner' input into the tag setup blank 553.

The screenshot, through which the host device 100 sets up the status information item which will be included in a message to be transmitted to the SNS server 200, includes a collection period setup item 560 to set up a collection period of the status information included in the message, in order to produce the message to be transmitted to the SNS server 200.

The collection period setup item 560 includes a collection period setup blank 561 into which a collection period is input.

Referring again to FIG. 5, after setting up the collection period of the desired status information item to be managed of the image forming apparatus 101, the host device 100 collects status information of the image forming apparatus 101 according to the setup collection period (410).

After collecting the status information of the image forming apparatus 101, the host device 100 determines whether or not the status information item exhibits a status change that requires management (412).

If it is determined from the result of operation 412 that a status change that requires management is not present, the host device 100 moves to operation 410.

On the other hand, if it is determined from the result of operation 412 that the status information item exhibits a status change that requires management, the host device 100 produces a message informing of the status change (414).

After producing the message informing of the status change, the host device 100 logs in to the SNS server 200 using the information to access the SNS server 200 set up in operation 402 (416).

After logging in to the SNS server 202, the host device 100 transmits the message produced in operation 414 (418).

Figure 8:
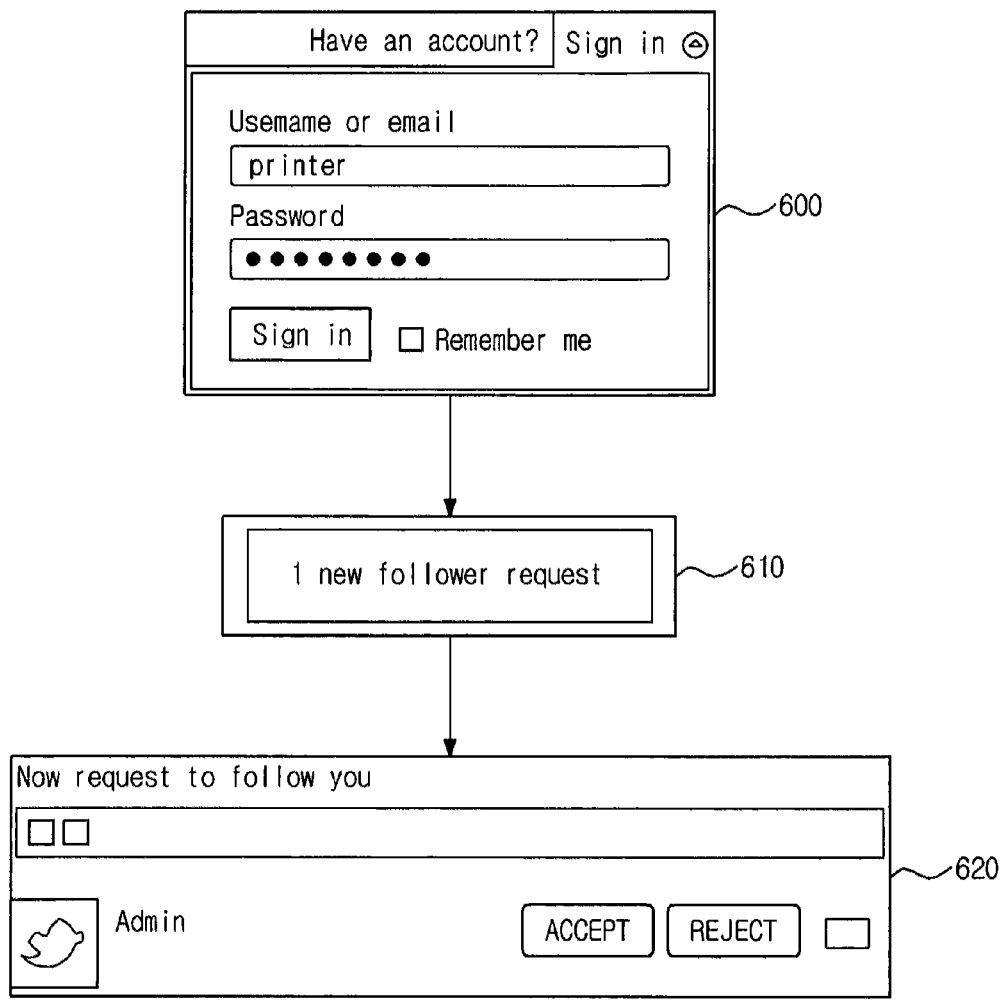
FIG. 8 is a view illustrating a process in which the host device of the network system in accordance with the embodiment of the present disclosure enters a specific community of the SNS server.

FIG. 8 is a view illustrating a process in which the host device of the network system in accordance with the embodiment of the present disclosure enters a specific community of the SNS server.

As illustrated in FIG. 8, to register the host device 100 as a constituent member of a service which allows users registered in a specific community of the SNS server 200 to share messages in common, the user first makes an account by inputting a web ID and password demanded at a membership screenshot 600 of the SNS server 200. FIG. 8 illustrates that the host device has been registered using a web ID "printer".

If the host device 100, which has been registered as a member of the service provided by the SNS server 200, requests to make a relationship via a relationship request screenshot 610 by means of a relationship program, such as a friend making program so as to allow an administrator (who has an ID 'Admin') pertaining to the community to read a status message of the image forming apparatus 100 and the administrator (who has the web ID "Admin") clicks an "Accept" icon on a relationship request response screenshot 620, the administrator "Admin" can read the status message of the image forming apparatus 101. Also, other users, who form a relationship with the administrator "Admin", can also read the status message of the image forming apparatus 101. In this case, it is also possible to allow only users who form a relationship with the host device 100 to read the status message of the image forming apparatus 101 while preventing other users who form a relationship with only the administrator "Admin" from reading the status message.

Figure 9:
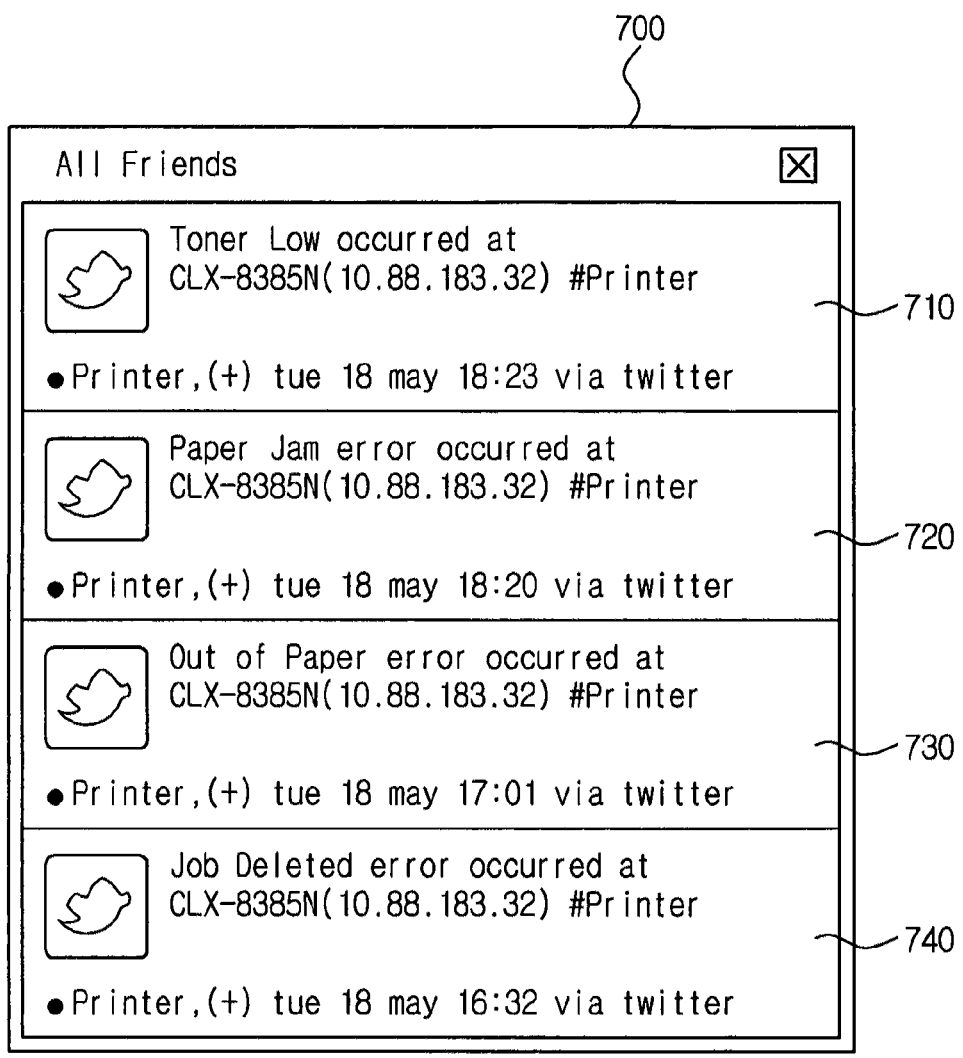
FIG. 9 is a view illustrating a screenshot of the message uploaded to the SNS server by the host device of the network system in accordance with the embodiment of the present disclosure.

FIG. 9 is a view illustrating a screenshot of the SNS server showing the message uploaded by the host device of the network system in accordance with the embodiment of the present disclosure.

As illustrated in FIG. 9, a home screenshot 700 of the SNS server 200 bulletins messages 710 to 740 successively uploaded by the host device 100 having the web ID "printer". Here, the messages 710 to 740 are listed in order of time. For example, the message 740 contains content 'Job Deleted error occurred at CLX-8385N (10.88.183.32) at May 18, Tues, 16:32'. As described above, all users of the community, to which the host device 100 has been registered, can read the messages 710 to 740 uploaded by the host device 100 having the web ID "printer".

Messages uploaded by the respective image forming apparatuses 101 are listed in order of time in such a manner that the messages are distinguishable from one another based on device names or IP addresses.

Figure 10:
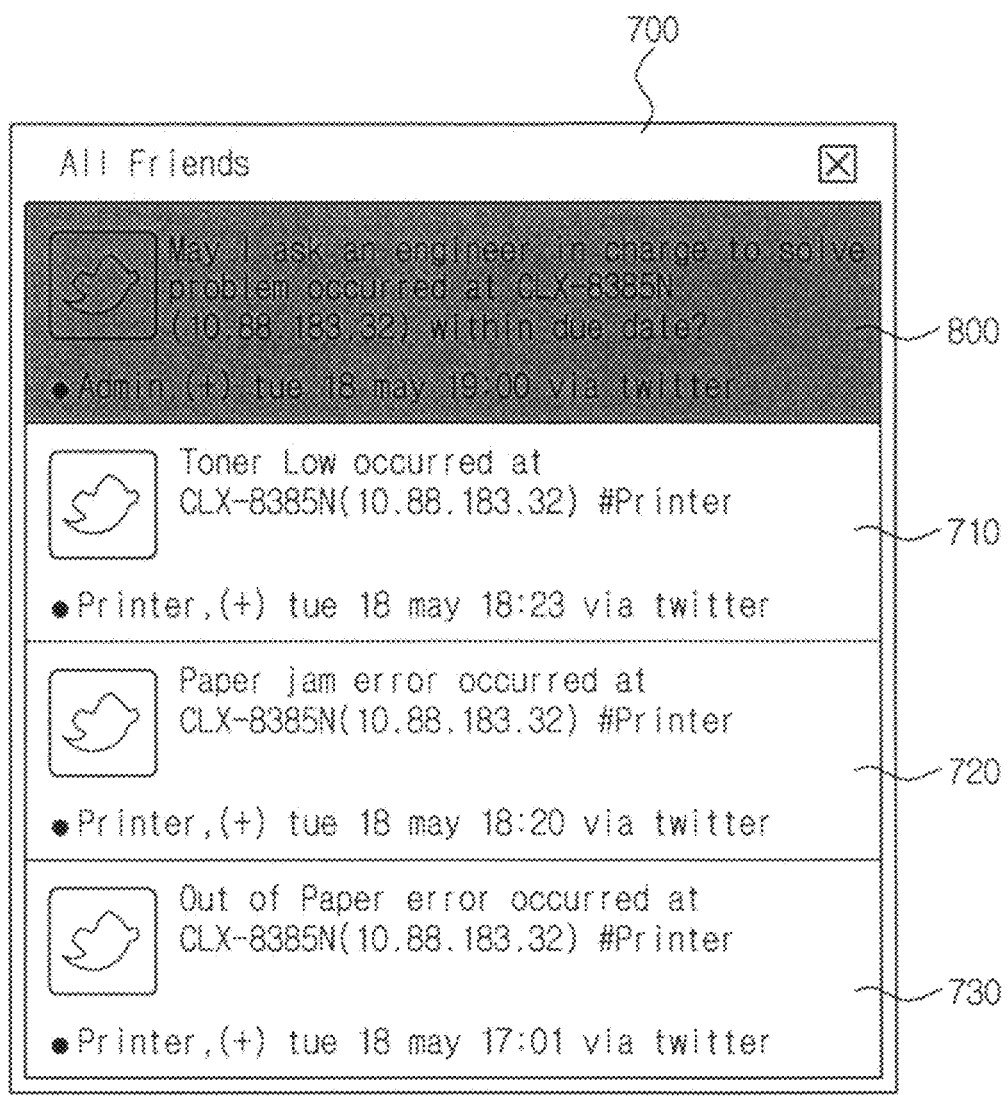
FIG. 10 is a view illustrating a screenshot through which an administrator who is accessing the SNS server takes a required measure while confirming the message associated with the status change of the image forming apparatus in the network system in accordance with the embodiment of the present disclosure.

FIG. 10 is a view illustrating a screenshot through which an administrator accesses the SNS server to take a required measure while confirming a message associated with the status change of the image forming apparatus in the network system in accordance with the embodiment of the present disclosure.

As illustrated in FIG. 10, after reading the messages 710 to 740 uploaded by the host device 100 whose web ID is "printer", the administrator whose web ID is "Admin" may upload a command message 800 informing of a measure with respect to the image forming apparatus 101 onto the home screenshot. Of course, all users pertaining to a corresponding community can read the command message 800.

Figure 11:
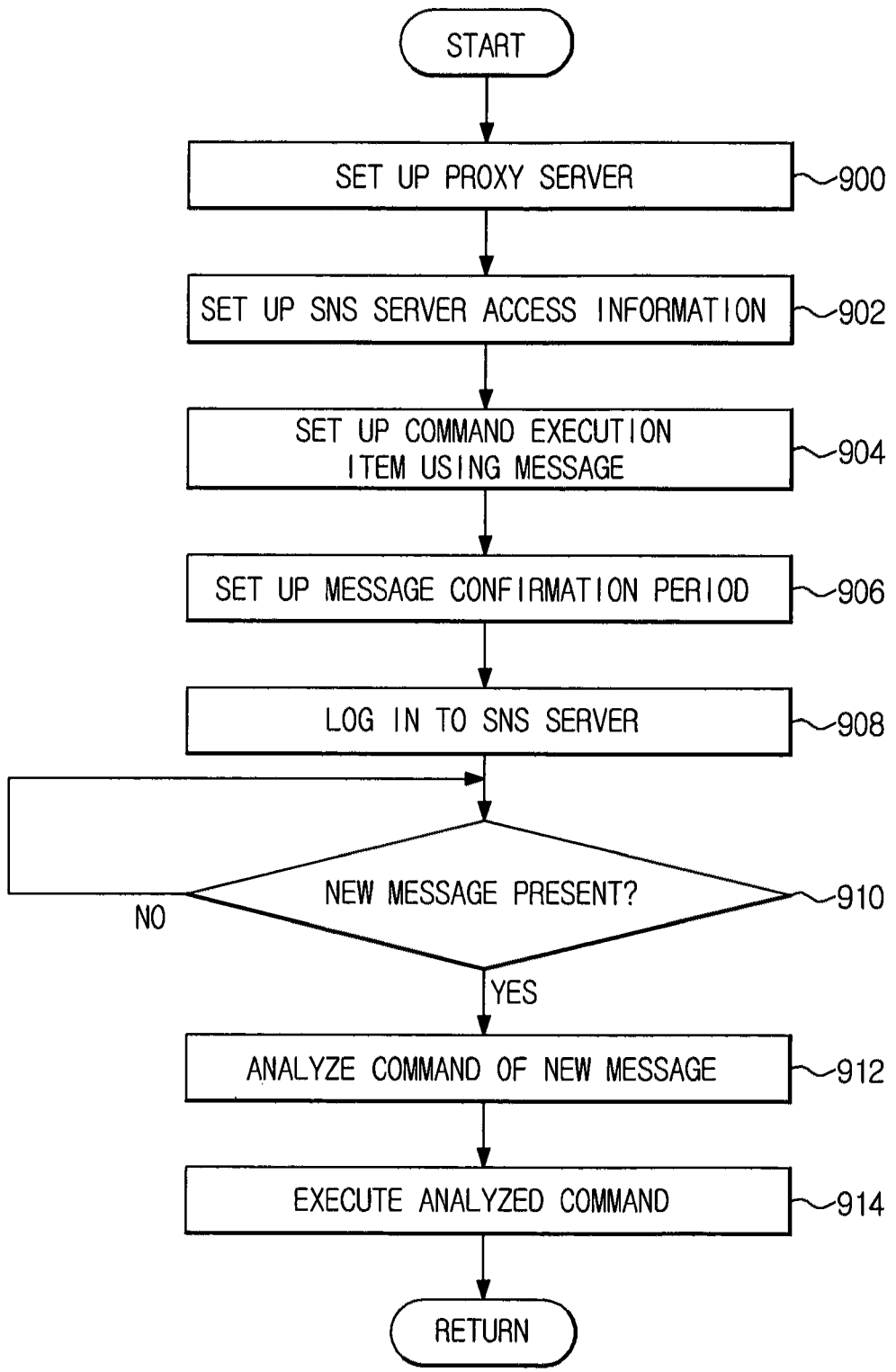
FIG. 11 is a flowchart illustrating a control process in which the host device of the network system in accordance with the embodiment of the present disclosure receives and processes a message transmitted from the SNS server.
Figure 12:
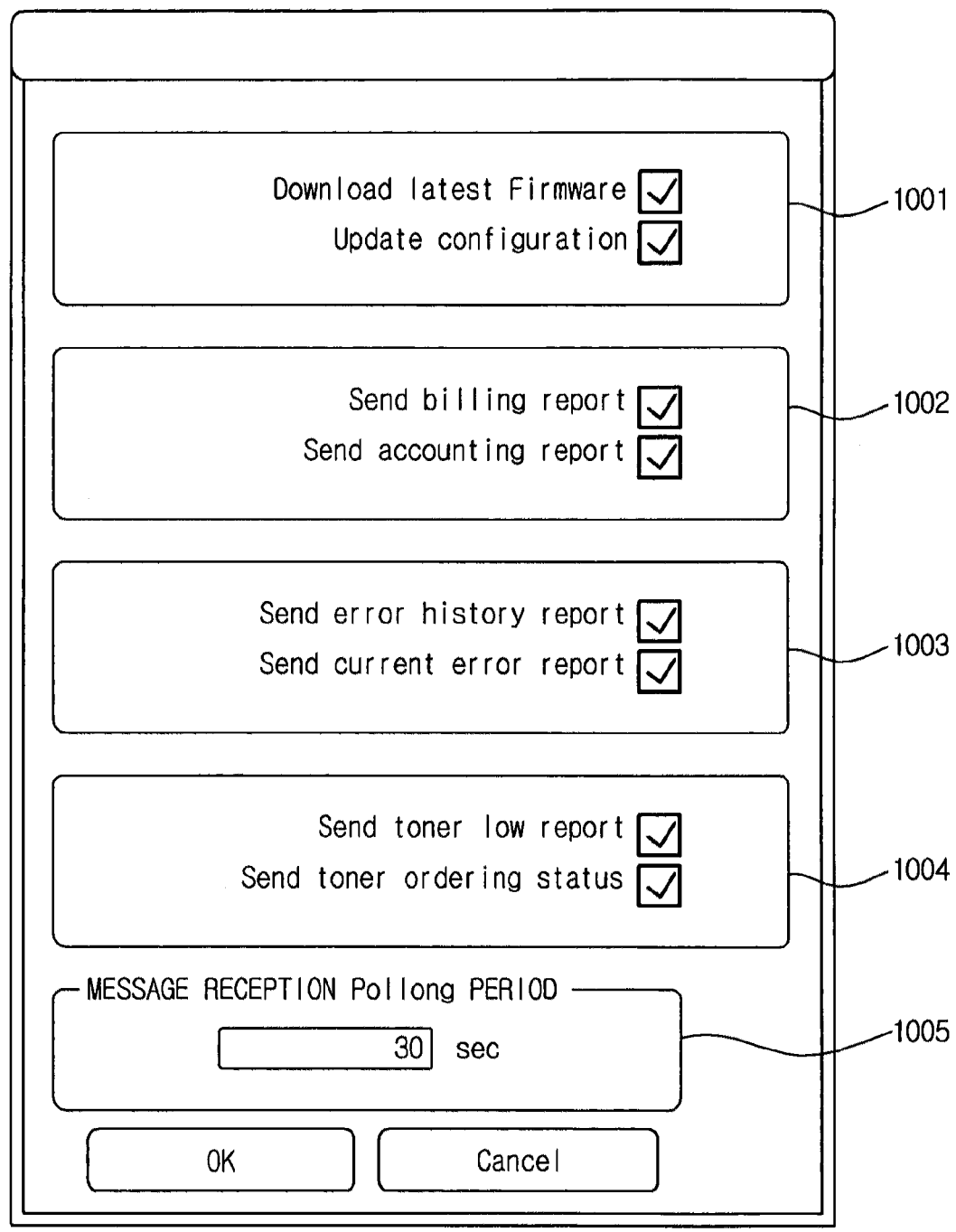
FIG. 12 is view illustrating a screenshot through which the host device sets up execution of a command included in the message received from the SNS server according to FIG. 11.

FIG. 11 is a flowchart illustrating a control process in which the host device of the network system in accordance with the embodiment of the present disclosure receives and processes a message transmitted from the SNS server. FIG. 12 is view illustrating a screenshot through which the host device sets up execution of a command of the message transmitted from the SNS server according to FIG. 11.

Referring to FIG. 11, the host device 100 sets up a proxy server (900). The host device 100 receives address and communication port information of the proxy server from the user and sets up the proxy server using the received information. In this case, if setup of the proxy server is unnecessary, this operation may be omitted.

The host device 100 sets up access information to the SNS server 200 (902). More particularly, the host device 100 receives address information of the SNS server 200, such as a URL given from the user, and log-in information (an web ID and password) given from the SNS server 200 and then, sets up information to access the SNS server 200 using the received information.

After setting up the information to access the SNS server 200, the host device 100 sets up whether or not to execute a command included in a message transmitted from the SNS server 200 according to information input from the user (904).

As illustrated in FIG. 12, the screenshot through which the host device 100 sets up execution of the command of the message transmitted from the SNS server 200 includes first, second, third and fourth command execution items 1001, 1002, 1003 and 1004.

The first command execution item 1001 is an item to set up execution of a command, such as 'download latest firmware' or 'update configuration'.

The second command execution item 1002 is an item to set up execution of a command, such as 'send billing report' or 'send accounting report'.

The third command execution item 1003 is an item to set up execution of a command, such as 'send error history report' or 'send current error report'.

The fourth command execution item 1004 is an item to set up execution of a command, such as 'send toner low report' or 'send toner order status'.

The user sets up whether or not to execute each command by marking or unmarking a check bar in a blank of each command execution item 1001, 1002, 1003 or 1004 on the message command execution setup screenshot.

The screen shot through which the host device 100 sets up execution of the command of the message transmitted from the SNS server 200 further includes a message confirmation period setup item 1005 to set up a confirmation period of the message transmitted from the SNS server 200.

Referring again to FIG. 10, after setting up whether or not to execute the command included in the message transmitted from the SNS server 200, the host device 100 sets up the message confirmation period (906). More particularly, the host device 100 receives and sets up the message confirmation period from the user.

After setting up the message confirmation period, the host device 100 logs in to the SNS server 200 using the information to access the SNS server 200 set up in operation mode 902 (908).

After logging in to the SNS server 200, the host device 100 judges whether or not a new command message mailed thereto is present on the home screenshot of the SNS server per the confirmation period set up in operation mode 906 (910).

If it is judged from the result of operation mode 910 that no new command message is present, the host device 100 moves to operation mode 910.

If it is judged from the result of operation mode 910 that the new command message is present, the host device 100 analyzes the new command message (912) and executes the corresponding command if execution of the analyzed command has been previously set up (914).

For reference, the command message may have a format of [command code][factor 1][factor 2] . . . [factor n]. In one example, if the command message '[H-RO1-0001]', the host device 100 may recognize a command to download the latest firmware from a download site. In this case, if execution of this command has been previously set up, the host device 100 executes control to access the download site and downward the latest firmware. In another example, if the command message is '[H-RO1-0003]', the host device 100 may recognize a command to send a billing report to an e-mail address of 'tedkong@mail.com'. In this case, if execution of this command has been previously set up, the host device 100 judges that the above command is valid and thus, executes control to send the billing report to the address of 'tedkong@mail.com' in response to the above command.

Hereinafter, a process in which the host device registers and uses a plurality of SNS accounts to the SNS server will be described.

Figure 13:
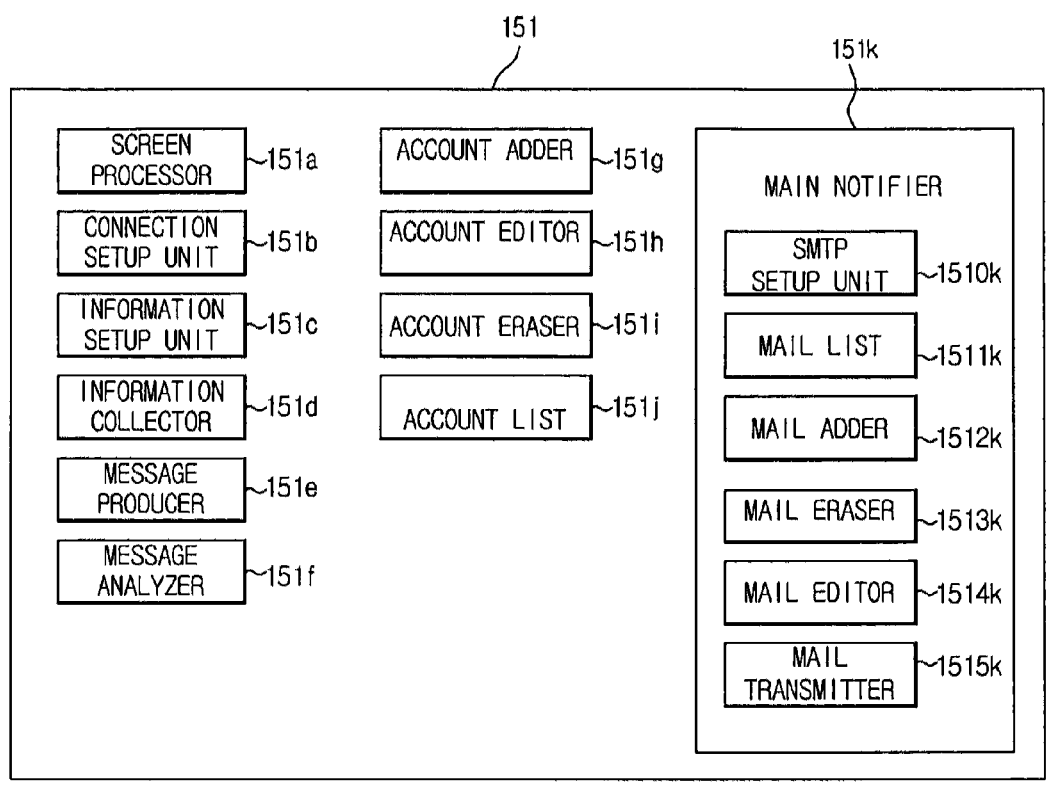
FIG. 13 is a view illustrating a configuration of the manager illustrated in FIG. 4 having a function to manage a plurality of SNS accounts.

FIG. 13 is a view illustrating a configuration of the manager 151 illustrated in FIG. 4, which is required to perform a function of managing a plurality of SNS accounts.

As illustrated in FIG. 13, the manager 151 includes the screen processor 151a, connection setup unit 151b, information setup unit 151c, information collector 151d, message producer 151e and message analyzer 151f.

The manager 151 having the above-described configuration performs a control operation to produce a message containing status information of the image forming apparatus 101 and a control operation to transmit the produced message to the SNS server 200.

The manager 151 periodically confirms whether or not a new message mailed thereto is present on the home screenshot of the SNS server 200. If a new message is present, the manager 151 analyzes a command of the message and performs a control operation to execute the analyzed command.

The manager 151 may further include an account adder 151g to add an account registered to the SNS server 200, an account editor 151h to edit the content of the account, an account eraser 151i to delete the account, an account list 151j to show a list of accounts, and a mail notifier 151k to transmit the list of accounts to the user by e-mail.

The main notifier 151k includes an SMTP setup unit 1510k to set up an SMTP server, a mail list 1511k to show a list of users who will receive e-mail, a mail adder 1512k to add a mail account, a mail eraser 1513k to delete the mail account, a mail editor 1514k to edit the content of the mail account, and a mail transmitter 1515k to transmit a mail.

The manager 151 having the above-described configuration may function to add a required number of SNS accounts, to edit or erase the preset SNS accounts, and to display a list of the preset SNS accounts.

The manager 151 may transmit the list of the preset SNS accounts to the user by e-mail. Thereby, the manager 151 may perform a control operation to transmit a plurality of preset SNS accounts to the user by e-mail, which allows the user to know accounts to follow.

In the case where the host device 100 cannot access the SNS server 200 using a particular SNS server, the manager 151 controls change of the account to allow the host device 100 to access using another accessible SNS account. For reference, in the case of the SNS server, the number of transmittable messages per SNS account is limited, for example, to 1050 and therefore, transmitting more than 1050 messages may require access to the SNS server 200 using another SNS account.

Accordingly, in order to allow the administrator who has accessed the SNS server to easily know the number of messages transmitted up to now and the total number of transmittable messages per account by simply looking at the message, the manager 151 controls attachment of tags, which represent information about the number of messages transmitted up to now and the total number of transmittable messages, to the message when transmitting the message to the SNS server 200.

As will be described hereinafter, the length of the message posted to the SNS server 200 is limited. In one example, in the case of a Tweet as the representative SNS server 200, the length of the message is limited to 140 letters per message. In another example, in the case of a Facebook as another representative SNS server, the length of the message is limited to 420 letters per message. Accordingly, it is noted that the message to be transmitted from the host device 100 to the SNS server 200 needs to fulfill the above-described requirements.

To this end, if the length of the message to be transmitted to the SNS server 200 exceeds a particular length predefined in the SNS server 200, the manager 151 may divide the message to have a length not exceeding the predefined length range and transmit the divided messages.

Figure 14:
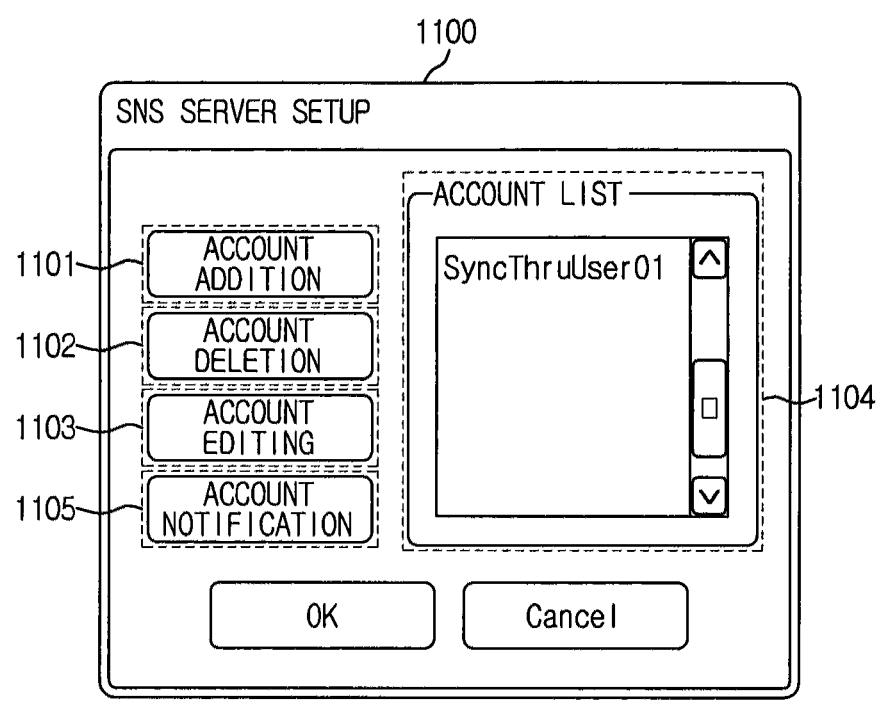
FIG. 14 is a view illustrating a screenshot through which the manager illustrated in FIG. 13 sets up addition, deletion, edition and mail notification of an SNS account.

FIG. 14 is a view illustrating a screenshot through which the manager illustrated in FIG. 13 sets up addition, deletion, edition and mail notification of the SNS account.

As illustrated in FIG. 14, an account screenshot 1100 includes an account addition item 1101 to add an account registered to the SNS server 200, an account deletion item 1102 to delete the account registered with the SNS server 200, an account editing item 1103 to edit the contents of the account, an account list item 1104 to show a list of accounts, and a mail notifying item 1105 to transmit the list of accounts to the user by e-mail.

If the user selects the account addition item 1101 on the account screenshot 1100, the account setup screenshot (see FIG. 6) is displayed, through which the user may add an SNS account.

Figure 15:
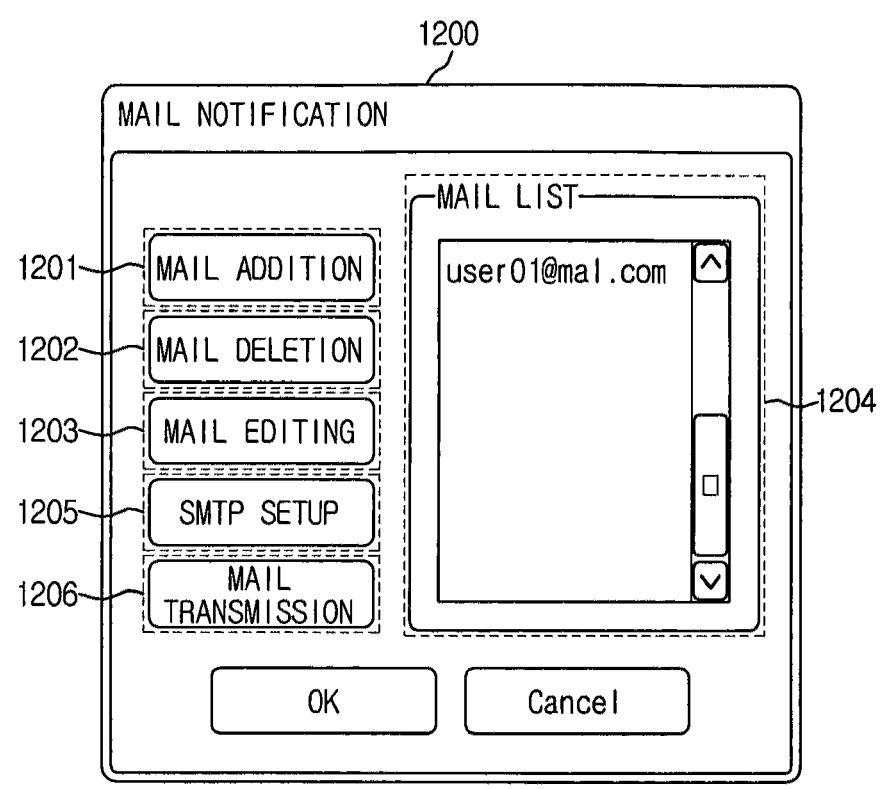
FIG. 15 is a view illustrating a screenshot displayed when a mail notifying item is selected from the screenshot illustrated in FIG. 14.

FIG. 15 is a view illustrating a screenshot displayed when the mail notifying item is selected from the screenshot illustrated in FIG. 14.

As illustrated in FIG. 15, a mail notification screenshot 1200 may include a mail addition item 1201 to add a mail account, a mail deletion item 1202 to delete the mail account, a mail editing item 1203 to edit the content of the mail account, a mail list item 1204 to show a list of mail accounts, an SMTP setup item 1205 to set up an SMTP server, and a mail transmission item 1206 to transmit a mail. Thereby, the manager 151 may transmit the list of accounts to an e-mail address included in the mail list.

Figure 16:
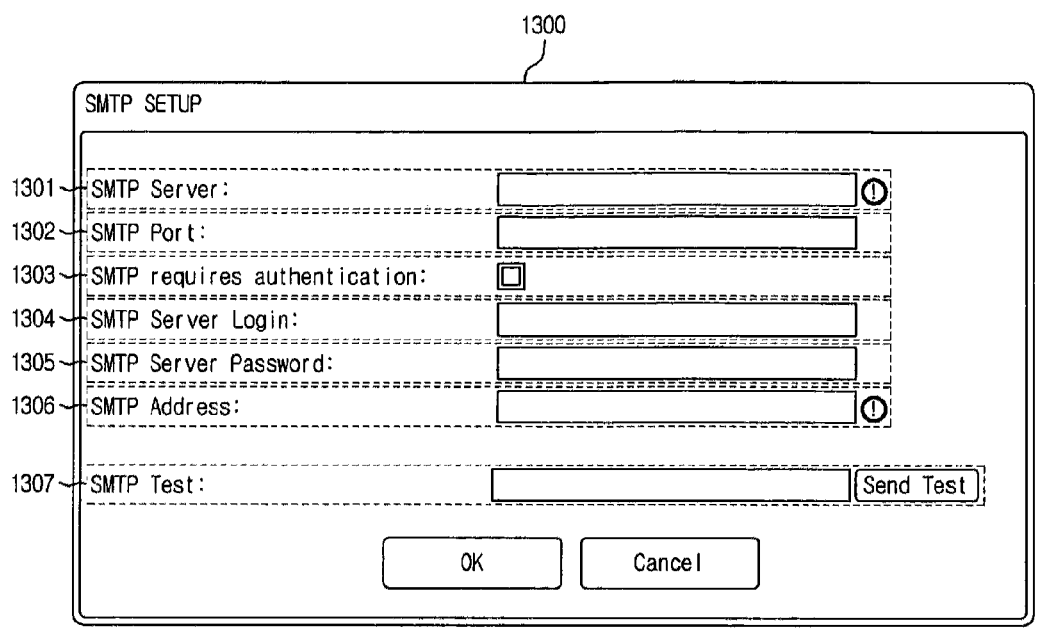
FIG. 16 is a view illustrating a screenshot displayed when an SMTP set-up item is selected from the screenshot illustrated in FIG. 15.

FIG. 16 is a view illustrating a screenshot displayed when the SMTP set-up item is selected from the screenshot illustrated in FIG. 15.

As illustrated in FIG. 16, an SMTP setup screenshot 1300 may include an SMTP server setup item 1301, an SMTP port setup item 1302, an authentication on/off item 1303, an SMTP server log-in user item 1304, an SMTP server log-in password item 1305, an e-mail address setup item 1306, and an SMTP validation item 1307.

Figure 17:
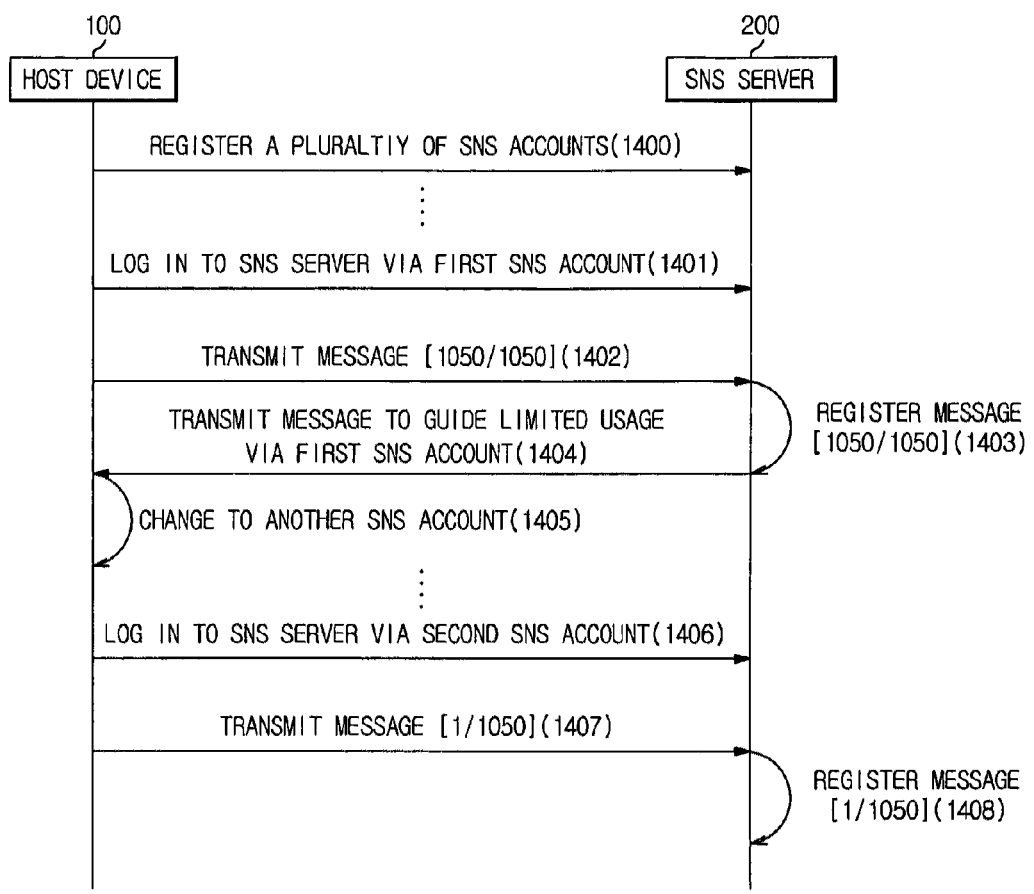
FIG. 17 is a flowchart illustrating a control process in which the host device of the network system in accordance with the embodiment of the present disclosure changes an SNS account via which the host device accesses the SNS server.

FIG. 17 is a flowchart illustrating a control process in which the host device of the network system in accordance with the embodiment of the present disclosure changes an SNS account via which the host accesses the SNS server.

Referring to FIG. 17, the host device 100 registers a plurality of SNS accounts with the SNS server 200 (1400).

The host device 100 logs in to the SNS server 200 using a first account after producing a message containing a status change of the image forming apparatus 101 when the status of the image forming apparatus is changed (1401).

The host device 100, which has been logged in to the SNS server 200 via the first account, transmits the produced message (for example, "message [1050/1050]") to the SNS server 200 (1402). In this case, the message contains tag information in the form of [the number of messages transmitted up to now]/[the total number of transmittable messages] as represented in the rear end of the message. Accordingly, the administrator who has received the message may immediately know how many messages the SNS account can further transmit by simply looking at the tag of the message.

As exemplified in the above description, if the number of messages transmitted up to now via the first account (1050) is equal to the total number of messages transmittable via the first account (1050) and reaches a critical value, it is necessary to automatically adopt a next SNS account. If the number of messages transmittable via all accounts reaches a critical value, the control process may return to the SNS server setup operation so as to add a new account, which raises the critical number value of all messages.

The SNS server 200 registers the message along with the tag information (1403), and transmits a guidance message that informs of exhaustion of the usage of the first account to the host device 100 so as to allow the host device 100 to log in to the SNS server 200 using another SNS account (1404).

Once the host device 100 has received the guidance message, the host device 100 changes the current SNS account to another SNS account, for example, a second SNS account (1405).

After changing the account, the host device 100 logs in to the SNS server 200 using the changed SNS account, for example, the second SNS account upon occurrence of a new status change that requires registration with the SNS server 200 (1406).

Once the host device 100 has logged in to the SNS server 200 using the second SNS account, the host device 100 transmits a message containing the new status change to the SNS server 200 (1407). In this case, the transmitted message has a form of "message [1/1050], where "1" represents a first message being transmitted via the second account and "1050" represents the total number of messages transmittable via the second account as described above. For reference, the tag information of the message may be represented as [a ratio of the number of transmitted messages to the total number of transmittable messages per hundred (%)], rather than being represented as [the number of messages transmitted up to now]/[the total number of transmittable messages]. As described above, adding the tag information associated with the number of messages to the message allows the administrator who has received the message to recognize the number of registerable messages relative to the number of messages. Thus, the administrator may previously recognize whether or not the number of transmitted messages will exceed the total number of transmittable messages.

The SNS server 200 receives and registers the message transmitted via the second SNS account (1408).

Figure 18:
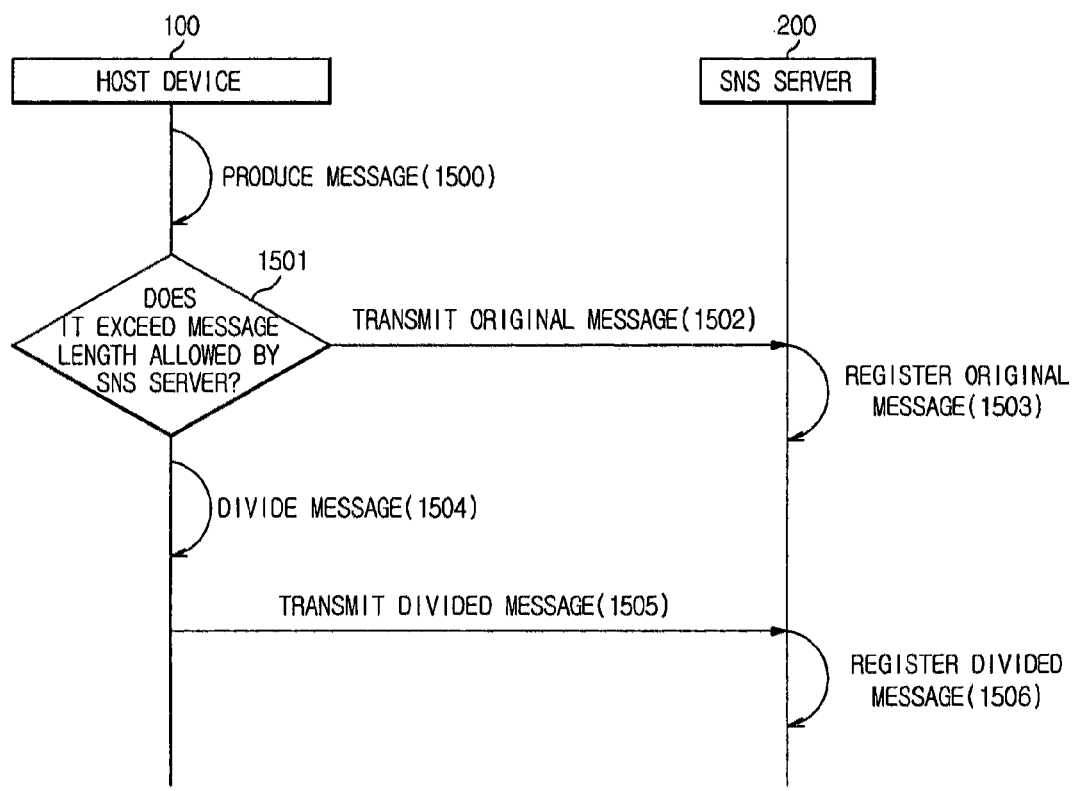
FIG. 18 is a flowchart illustrating a control process in which the host device of the network system in accordance with the embodiment of the present disclosure divides a message and transmits the divided message to the SNS server.

FIG. 18 is a flowchart illustrating a control process in which the host device of the network system in accordance with the embodiment of the present disclosure divides a message and transmits the divided message to the SNS server.

Referring to FIG. 18, the host device 100 produces a message containing a status change of the image forming apparatus 101 when the status of the image forming apparatus 101 is changed (1500).

After producing the message, the host device 100 compares the length of the produced message with an allowable message length predefined in the SNS server 200 and determines whether or not the length of the produced message exceeds the allowable message length (1501).

If it is determined from operation 1501 that the length of the produced message does not exceed the allowable message length, the host device 100 transmits the original message directly (1502).

The SNS server 200 receives and registers the original message (1503).

On the other hand, if it is determined from operation 1501 that the length of the produced message exceeds the allowable message length, the host device 100 divides the message to have a length within an allowable length range (1504). Then, the host device 100 transmits each divided message to the SNS server 200 (1505).

The SNS server 200 receives and registers the divided message (1506).

Hereinafter, an embodiment in which the image forming apparatus 101 directly uploads the status message to the SNS server 200 and receives a command message transmitted from the service server 200 via a network without the host device 100 will be described.

Figure 19:
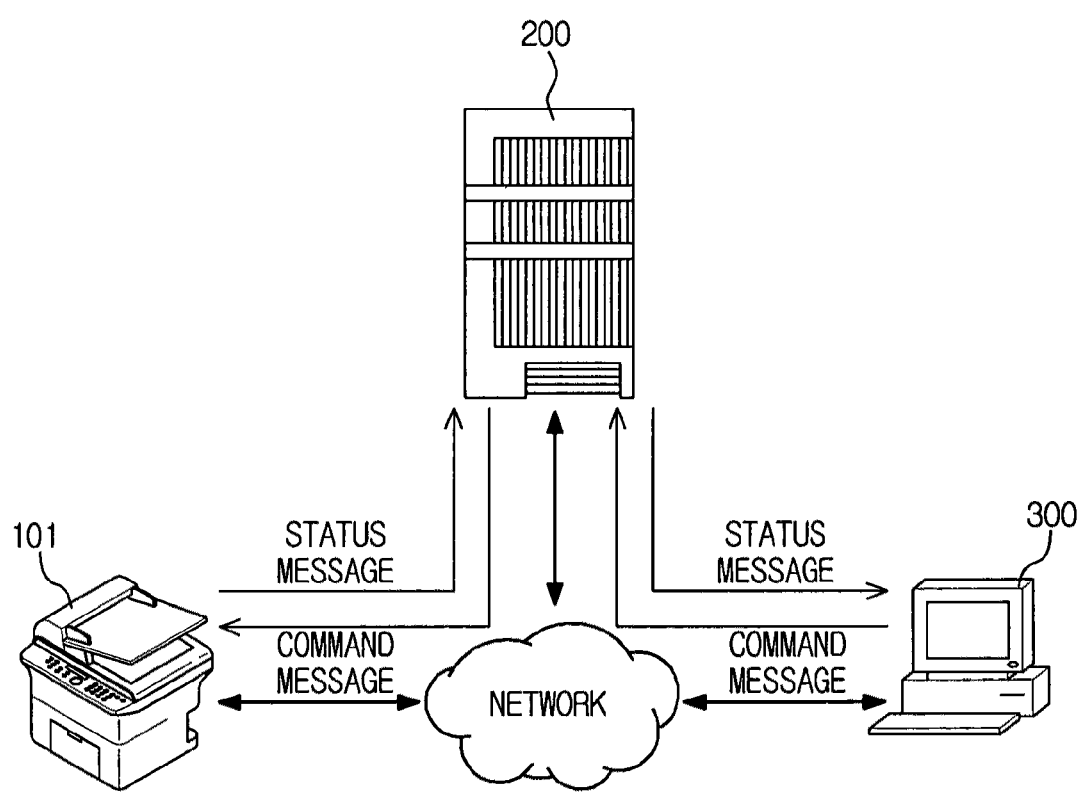
FIG. 19 is a view illustrating the overall configuration of a network system in accordance with another embodiment of the present disclosure.

FIG. 19 is a view illustrating the overall configuration of a network system in accordance with another embodiment of the present disclosure.

As illustrated in FIG. 19, the network system includes the image forming apparatus 101, the service server 200 and the user terminal 300.

The image forming apparatus 101 is under management of the network system and may be, for example, a device combining functions of a copier, fax machine and printer, a color printer, or a black-and-white printer.

The image forming apparatus 101 produces the status message thereof and accesses the service server 200 and uploads the produced status message to the service server 200 via a network. The network may be a wired or wireless communication network using a protocol to allow the image forming apparatus 101 to access the service server 200 via a web browser.

The image forming apparatus 101 also functions to receive a command message from the service server 200 and analyze the received command message to perform a command pertaining to the command message.

The service server 200 receives the status message uploaded by the image forming apparatus 101 and posts the message on a website to allow users, who are allowed to share messages, to read the message. In this case, the service server 200 posts the status message of the image forming apparatus 101 on a home screenshot on the website so as to allow every user who is allowed to share messages to read the message from the home screenshot. With this function of the service server 200, the image forming apparatus 101 can read messages posted on the home screenshot by other users.

It is noted that the same objective as the above described embodiments may be achieved even when a non-transitory recording medium, in which program code of software realizing the functions of the above-described embodiments is recorded, is given to a system or apparatus and a computer of the system or apparatus reads the program code to execute the functions.

In this case, the program code read from the recording medium realizes the functions of the above-described embodiments, and the non-transitory recording medium storing the program code constitutes a part of the embodiment.

Examples of the non-transitory recording medium to provide the program code include a hard disk, an optical disc, a CD ROM, a magnetic tape, a memory card and a ROM.

It is not excluded from the scope of the embodiments that the program code read from the recording medium is recorded in an extended board inserted in the computer or an extended unit connected to the computer and that a CPU provided in the extended board or the extended unit executes all or a part of actual processes based on instructions included in the program code so as to realize the functions of the above-described embodiments.

Figure 20:
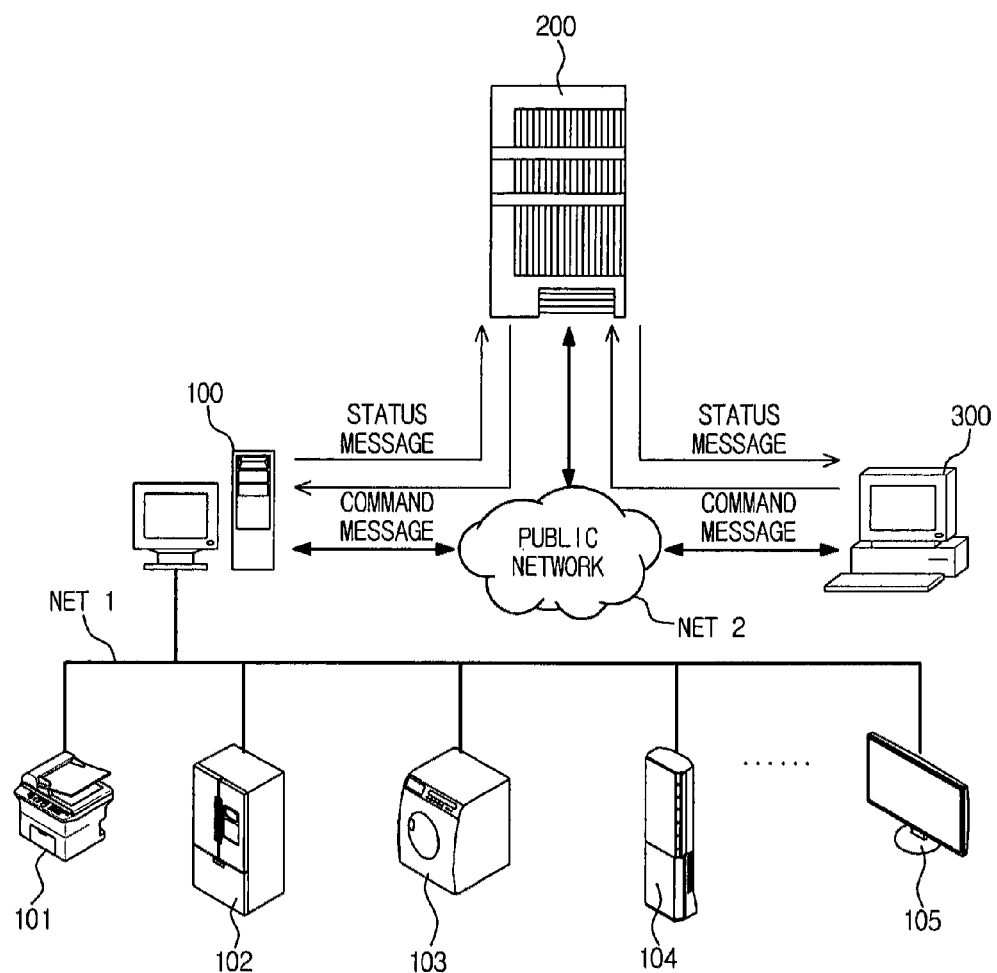
FIG. 20 is a view illustrating the overall configuration of a network system in accordance with a further embodiment of the present disclosure.

FIG. 20 is a view illustrating the overall configuration of a network system in accordance with a further embodiment of the present disclosure.

As illustrated in FIG. 20, the network system includes a plurality of electronic devices including the image forming apparatus 101, a refrigerator 102, a washing machine 103, an air conditioner 104 and a television 105, the host computer 100 connected to the plurality of electronic devices 101 to 105 via the private network NET 1 as an internal network, the service server 200 connected to the host computer 100 via the public network NET 2 via an external network, and the user terminal 300.

The host device 100 may collect status information of the respective electronic devices 101 to 105, produce the status message informing of the state of the respective electronic devices, access the service server 200 via the public network NET 2 and upload the produced status message to the service server 200. Thereby, the administrator may confirm the status message posted to the network website of the service server 200, which enables efficient management of the respective electronic devices.

If the administrator posts a command message to the network service website in order to operate an electronic device which the administrator desires to manage, the host device 100 confirms whether or not a command message mailed thereto is present among several messages posted to the network service website. If the command message mailed to the host device 100 is present, the host device 100 receives the command message from the service server 200 and analyzes a command of the received command message so as to control operation of the image forming apparatus 101.

As is apparent from the above description, in one aspect of the present disclosure, a host device to manage an image forming apparatus functions to upload a message informing of the status of the image forming apparatus to a network service in which users who have a social relationship can share messages on a website. Accordingly, an administrator of the image forming apparatus may monitor the status of the image forming apparatus, irrespective of time and place, by simply accessing the website of a service server providing the network service, which enables more effective management of the image forming apparatus.

In another aspect of the present disclosure, the host device has the ability to exchange messages with the service server and thus, confirm a command message uploaded to the service server by the administrator, thereby allowing the image forming apparatus to perform an operation pertaining to the command message, which may simplify various operations, such as firmware update.

In another aspect of the present disclosure, the administrator is allowed to access the service server to read or send messages associated with the image forming apparatus, which enables simplified management of the image forming apparatus. Therefore, an access process or access path to monitor the image forming apparatus may be simplified, providing convenience of access for management of the image forming apparatus.

In another aspect of the present disclosure, in the case where the host device transmits messages to a service server which limits the number of transmittable messages per account, the host device may continue transmission of messages by changing an account if the number of messages exceeds a predetermined value. This ensures stable management of the image forming apparatus even with respect to the service server having a limited number of transmittable messages.

In another aspect of the present disclosure, when the host device transmits messages to the service server which limits the number of transmittable messages per account, the host device may provide the messages with tag information in the form of [the number of currently used messages]/[the total number of possible message]. Thus, the administrator may rapidly confirm how many messages can further be transmitted via a current account by simply looking the messages at a glance.

In accordance with a further aspect of the present disclosure, in the case where the host device transmits messages to the service server which limits the length of messages per account, the host device may continue transmission of messages by dividing the messages if the length of messages exceeds a predetermined value. This ensures stable management of the image forming apparatus even with respect to the service server having a limited length of transmittable messages.

Although the embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A control method of a host device, the host device serving to manage at least one image forming apparatus, the method comprising:
    collecting status information of the at least one image forming apparatus;
    determining whether the status information indicates that the at least one image forming apparatus has undergone a status change that requires management;
    producing a status message informing of a status change if the at least one image forming apparatus undergoes the status change that requires management; and
    controlling uploading of the produced status message to a Social Network Service (SNS) server, wherein the SNS server provides SNS to allow an administrator of the image forming apparatus to confirm the produced status message on an SNS website on which users may read messages simultaneously to share the messages,
    wherein the status message uploading controlling includes accessing an IP address of the SNS server, logging in to the SNS server using SNS account information given to the host device after being connected to the SNS server, and transmitting the status message to the SNS server after logging in to the SNS server,
    the SNS server has a limit as to the number of receivable messages per SNS account, the host device includes a plurality of SNS accounts via which the host device may log in to the SNS server, and the SNS server logging-in includes changing a current SNS account into another SNS account if the number of messages transmitted using the current SNS account used to log in to the SNS server exceeds the number of messages preset by the SNS server.

2. The control method according to claim 1, wherein the status message producing includes judging whether or not informing status information relating to the status change is set up and producing the status message containing the status information relating to the status change if informing of the status information is set up.

3. The control method according to claim 2, wherein the status message producing includes producing the status message containing at least one of a name and an IP address of the image forming apparatus which has undergone the status change.

4. The control method according to claim 2, wherein in the status message producing, the status information includes at least one of paper related information, operation related information, apparatus related information and toner related information of the image forming apparatus which has undergone the status change.

5. The control method according to claim 1, wherein if the host device includes the plurality of SNS accounts via which the host device may log in to the SNS server, the method further comprises transmitting a list of the plurality of SNS accounts to e-mail addresses that are preset to correspond to the plurality of SNS accounts.

6. The control method according to claim 1, wherein in the status message uploading controlling, the status message includes any one of tag information, which represents the number of messages transmitted up to now via the current SNS account and the total number of transmittable messages, and tag information which represents a ratio of the number of transmitted messages to the total number of transmittable messages per hundred (%).

7. The control method according to claim 6, wherein the status message uploading controlling includes comparing a length of the status message with a message length preset by the SNS server, and dividing and transmitting the status message to have a length within a message length range preset by the SNS server if a comparative result shows that the length of the message exceeds the message length preset by the SNS server.

8. The control method according to claim 1, further comprising:

receiving a command message from the SNS server if messages uploaded to the SNS website by other users include the command message mailed to the host device;

analyzing the received command message; and controlling operation of the corresponding image forming apparatus based on the analyzed command message.

9. The control method according to claim 8, wherein the command message analyzing includes judging whether or not at least one command execution item included in the received command message is activated, and judging the activated command execution item into a valid command.

10. A host device to manage at least one image forming apparatus, the device comprising:

a first network interface unit to communicate with the at least one image forming apparatus via a network;

a second network interface unit to communicate with an SNS server via a network, wherein the SNS server provides SNS to allow users to read messages simultaneously on a website to share the messages; and a control unit to collect status information of the at least one image forming apparatus, determining whether the status information indicates that the at least one image forming apparatus has undergone a status change that requires management, produce a status message informing of a status change if the at least one image forming apparatus undergoes the status change that requires management, and control uploading of the produced status message to the SNS server so as to allow an administrator of the image forming apparatus to confirm the produced status message on the SNS website, wherein the control unit accesses an IP address of the SNS server via the second network interface unit, logs in to the SNS server using SNS account information given to the host device after being connected to the SNS server, and transmits the status message to the SNS server after logging in to the SNS server, the SNS server has a limit as to the number of receivable messages per SNS account, and the host device includes a plurality of SNS accounts via which the host device may log in to the SNS server, and the control unit changes a current SNS account into another SNS account if the number of messages transmitted using the current SNS account used to log in to the SNS server exceeds the number of messages preset by the SNS server.

11. The host device according to claim 10, wherein the control unit judges whether or not informing status information relating to the status change is set up and produces the status message containing the status information relating to the status change if informing of the status information is set up.

12. The host device according to claim 11, wherein the control unit produces the status message containing at least one of a name and an IP address of the image forming apparatus which has undergone the status change.

13. The host device according to claim 10, wherein if the host device includes the plurality of SNS accounts via which the host device may log in to the SNS server, the control unit transmits a list of the plurality of SNS accounts to e-mail addresses that are preset to correspond to the plurality of SNS accounts.

14. The host device according to claim 10, wherein the control unit produces the status message including any one of tag information, which represents the number of messages transmitted up to now via the current SNS account and the total number of transmittable messages, and tag information which represents a ratio of the number of transmitted messages to the total number of transmittable messages per hundred (%).

15. The host device according to claim 14, wherein the control unit compares a length of the status message with a message length preset by the SNS server, and divides and transmits the status message to have a length within a message length range preset by the SNS server if a comparative result shows that the length of the message exceeds the message length preset by the SNS server.

16. The host device according to claim 10, wherein the control unit receives a command message from the SNS server if messages uploaded to the SNS website by other users include the command message mailed to the host device, analyzes the received command message, and controls operation of the corresponding image forming apparatus based on the analyzed command message.

17. The host device according to claim 16, wherein the control unit judges whether or not at least one of command execution items included in the received command message is activated, and judges the activated command execution item into a valid command.

18. A control method of an image forming apparatus connected to a host device, the method comprising:
collecting status information of the image forming apparatus;
determining whether the status information indicates that the image forming apparatus has undergone a status change that requires management; and
transmitting the collected status information to the host device,
wherein the host device, which has received the transmitted status information, judges whether or not the image forming apparatus undergoes a status change that requires management based on the status information, produces a status message informing of the status change if the status change occurs, and uploads the produced status message to a Social Network Service (SNS) server, wherein the SNS server provides SNS to allow an administrator of the image forming apparatus to confirm the produced status message on an SNS website on which users may share messages,
the host device accesses an IP address of the SNS server, logs in to the SNS server using SNS account information given to the host device after being connected to the SNS server, and transmits the status message to the SNS server after logging in to the SNS server,
the SNS server has a limit as to the number of receivable messages per SNS account, and the host device includes a plurality of SNS accounts via which the host device may log in to the SNS server, and
the host device changes a current SNS account into another SNS account if the number of messages transmitted using the current SNS account used to log in to the SNS server exceeds the number of messages preset by the SNS server.

19. The control method according to claim 18, wherein the status information includes at least one of paper related information, operation related information, apparatus related information and toner related information of the image forming apparatus.

20. The control method according to claim 18, further comprising:
receiving a command from the host device; and
executing an operation commanded by the host device if the received command is a command based on a command message mailed to the host device among messages uploaded to the SNS website by other users.

* * * * *